United States Patent
Luthra

(10) Patent No.: US 10,094,236 B2
(45) Date of Patent: Oct. 9, 2018

(54) RECESSION RESISTANT CERAMIC MATRIX COMPOSITES AND ENVIRONMENTAL BARRIER COATINGS

(71) Applicant: GENERAL ELECTRIC COMPANY, Schenectady, NY (US)

(72) Inventor: Krishan Lal Luthra, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1284 days.

(21) Appl. No.: 13/834,350

(22) Filed: Mar. 15, 2013

(65) Prior Publication Data
US 2016/0024962 A1   Jan. 28, 2016

(51) Int. Cl.
*C04B 35/195* (2006.01)
*F01D 25/00* (2006.01)
(Continued)

(52) U.S. Cl.
CPC .......... *F01D 25/005* (2013.01); *C04B 35/195* (2013.01); *C04B 35/48* (2013.01);
(Continued)

(58) Field of Classification Search
CPC ..... F01D 25/005; C04B 35/50; C04B 35/195; C04B 35/48; C04B 35/584; C04B 35/565;
(Continued)

(56) References Cited

U.S. PATENT DOCUMENTS 6,299,988 B1   10/2001  Wang et al.
7,442,444 B2 *  10/2008  Hazel et al. .................. 428/641
(Continued)

FOREIGN PATENT DOCUMENTS

CN    1935746 A    3/2007
CN    102689461 A    9/2012
(Continued)

OTHER PUBLICATIONS

"Its Elemental, The Element Silicon", http://education.jlab.org/itselemental/ele014.html, 2 pages, internet retrieval date of Dec. 14, 2016.*
(Continued)

*Primary Examiner* — Jonathan C Langman
(74) *Attorney, Agent, or Firm* — John P. Darling

(57) ABSTRACT

The disclosure relates generally to recession resistant gas turbine engine articles that comprise a silicon containing substrate, and related coatings and methods. The present disclosure is directed, inter alia, to an engine article comprising a silicon substrate which is coated with a chemically stable porous oxide layer. The present disclosure also relates to articles comprising a substrate and a bond coat on top comprising a two phase layer of interconnected silicon and interconnected oxide, followed by a layer of silicon. The present disclosure further relates to a recession resistant article comprising an oxide in a silicon containing substrate, such that components of the silicon containing substrate is interconnected with oxides dispersed in the substrate and form the bulk of the recession resistant silicon containing article.

16 Claims, 15 Drawing Sheets

(51) Int. Cl.

| | |
|---|---|
| *C23C 28/04* | (2006.01) |
| *F01D 5/28* | (2006.01) |
| *C04B 41/87* | (2006.01) |
| *C04B 41/89* | (2006.01) |
| *C04B 41/00* | (2006.01) |
| *C04B 41/50* | (2006.01) |
| *C04B 41/52* | (2006.01) |
| *C04B 35/48* | (2006.01) |
| *C04B 35/50* | (2006.01) |
| *C04B 35/565* | (2006.01) |
| *C04B 35/58* | (2006.01) |
| *C04B 35/584* | (2006.01) |
| *C04B 35/597* | (2006.01) |
| *C04B 111/00* | (2006.01) |

(52) U.S. Cl.
CPC ............ *C04B 35/50* (2013.01); *C04B 35/565* (2013.01); *C04B 35/584* (2013.01); *C04B 35/58092* (2013.01); *C04B 35/597* (2013.01); *C04B 41/009* (2013.01); *C04B 41/5024* (2013.01); *C04B 41/52* (2013.01); *C04B 41/87* (2013.01); *C04B 41/89* (2013.01); *C23C 28/042* (2013.01); *C23C 28/044* (2013.01); *C23C 28/048* (2013.01); *F01D 5/284* (2013.01); *C04B 2111/00405* (2013.01); *F05D 2300/514* (2013.01); *F05D 2300/6033* (2013.01); *Y02T 50/672* (2013.01)

(58) Field of Classification Search
CPC . C04B 35/597; C04B 35/58092; C04B 41/87; C04B 41/89; C04B 41/009; C04B 41/5024; C04B 41/52; C23C 28/048; C23C 28/042; C23C 28/044
See application file for complete search history.

(56) References Cited

U.S. PATENT DOCUMENTS

| | | |
|---|---|---|
| 7,740,960 B1 | 6/2010 | Zhu et al. |
| 2005/0042461 A1* | 2/2005 | Li et al. .................... 428/446 |
| 2006/0154093 A1 | 7/2006 | Meschter |
| 2007/0065672 A1 | 3/2007 | Bhatia et al. |
| 2009/0250153 A1* | 10/2009 | Meschter et al. ............ 156/60 |
| 2010/0080984 A1* | 4/2010 | Lee .................... C04B 35/16 |
| | | 428/334 |
| 2010/0129673 A1 | 5/2010 | Lee |
| 2013/0122259 A1 | 5/2013 | Lee |
| 2016/0153288 A1 | 6/2016 | Luthra |

FOREIGN PATENT DOCUMENTS

| | | | |
|---|---|---|---|
| EP | 1683773 A2 | 7/2006 | |
| EP | 2138477 A2 | 12/2009 | |
| EP | 2194164 A1 | 6/2010 | |
| EP | 2284139 A2 | 2/2011 | |
| WO | 2011020849 A1 | 2/2011 | |
| WO | WO2011085376 * | 7/2011 | ............ C23C 28/00 |
| WO | 2012129431 A1 | 9/2012 | |

OTHER PUBLICATIONS

Wang et al. "Synthesis of Single-Phase b-Yb2Si2O7 and Properties of Its Sintered Bulk", Int. J. Appl. Ceram. Technol., vol. 12, No. 6, 2015, pp. 1140-1147.*

PCT International Search Report and Written Opinion issued in connection with corresponding WO Patent Application No. PCT/US2014/020734 dated Jun. 24, 2014.

Hans J. Seifert et al: "Yttrium Silicate Coatings on Chemical Vapor Deposition-SiC-Precoated C/C—SiC: Thermodynamic Assessment and High-Temperature Investigation". Journal of the American Ceramic Society. vol. 88. No. 2. Feb. 1, 2005 (Feb. 1, 2005).-Feb. 28, 2005 (Feb. 28, 2005). pp. 424-430. XP055123331.

Unofficial English translation of Office Action issued in connection with corresponding CN Application No. 201480027420.7 dated May 11, 2016.

Unofficial English translation of Office Action issued in connection with corresponding CN Application No. 201480027420.7 dated Jul. 26, 2017.

* cited by examiner

A)

B)

A)

B)

A)

B)

C)

RECESSION RESISTANT CERAMIC MATRIX COMPOSITES AND ENVIRONMENTAL BARRIER COATINGS

BACKGROUND

The disclosure relates generally to ceramic matrix composites. More particularly, embodiments herein generally describe recession resistant ceramic matrix composites, coatings and related articles and methods used in the gas turbine and aerospace industries.

Higher operating temperatures for gas turbine engines are continuously being sought in order to improve their efficiency. However, as operating temperatures increase, the high temperature durability of the articles of the engine must correspondingly increase. Significant advances in high temperature capabilities have been achieved through the formulation of iron, nickel, and cobalt-based superalloys. While superalloys have found wide use for articles used throughout gas turbine engines, and especially in the higher temperature sections, alternative lighter-weight substrate materials have been proposed.

Ceramic matrix composites are a class of materials that consist of a reinforcing material surrounded by a ceramic matrix phase, and are currently proposed for use for higher temperature applications. Ceramic matrix composites can decrease the weight, yet maintain the strength and durability, of turbine articles used in higher temperature sections of gas turbine engines, such as airfoils (blades and vanes), combustors, shrouds and other like articles that would benefit from the lighter-weight these materials can offer.

It is well known that one of the critical problems in using silicon carbide ceramics is the loss of thickness of the ceramic matrix composite ("CMC") resulting from the reaction of the ceramic with the moisture in the combustion gases. Consequently, environmental barrier coatings ("EBCs") are used to protect the CMCs from the loss of thickness or the recession of the ceramic by volatilization. EBCs developed to date are multi-layer coatings with a bond coat of silicon or silicon-containing material, which on oxidation forms silicon oxide.

Experience to date has shown that environmental barrier coatings usually have local spalls, such as caused by foreign object damage or handling damage. It is believed that for most hot stage components, this would result in very high volatilization rates locally in the region of spalls resulting in the formation of holes in the CMC components. In particular, when EBCs spall off, the underlying substrate is exposed to the moisture-containing combustion gases, and in some other cases (for example, when the EBC is porous or cracked), the moisture can diffuse through the porous/cracked layer to oxidize the underlying substrate and cause recession of the substrate. This is believed to be one of the major problems in the commercialization of CMCs, and the ceramic community has been working to solve this problem. It is, therefore, desirable to increase the recession resistance of the CMC substrate. It is also desirable to increase the robustness of the EBC system so that when the local EBC spallation occurs the recession resistance of the system is still acceptable.

Moreover, there is a strong driving force to develop ceramic matrix composites for applications at temperatures up to 2700 F. Volatilization of silicon as silicon hydroxide is one of the key problems with such composites because it leads to loss of thickness with time. Environmental Barrier Coatings (EBCs) are used to alleviate this problem. However, many EBCs use a silicon bond layer on the surface of the CMCs, and silicon melts at temperatures around 2550 F. Therefore, silicon-based coatings are currently not practical at temperatures over about 2550 F. Therefore, not only is there a need in the art for recession-resistant CMCs, there is also a need in the art for new EBCs that can operate at higher temperatures. There is also a need for robust EBCs so that the recession of the ceramic substrate is acceptable even when there is local spallation of the EBC layers. In short, there is a need in the art for improved recession resistant CMCs, EBCs, articles and methods for making them.

SUMMARY

Aspects of the present disclosure increase the life of the CMC article substantially. One aspect of the present disclosure is directed to a recession resistant gas turbine engine article, comprising a silicon containing substrate coated with a chemically stable porous oxide layer. The silicon containing substrate, in one embodiment, is ceramic and is selected from the group consisting of silicon nitride, silicon carbide, silicon oxinitride, a metal silicide, a ceramic matrix composite material, and combinations thereof. In one embodiment, the substrate comprises a SiC—SiC ceramic matrix composite.

In one embodiment, the porous layer contains porosity of about 5 to 50%. The porosity of the layer, in one embodiment, is graded to provide mechanical structural integrity to the substrate/coating interface. In one embodiment, the oxide layer is chemically stable in moisture containing environments and/or exhibits no more than about 30% negative volume change associated with reaction with water vapor. In another embodiment, the oxide layer is chemically stable with silicon oxide and has an expansion coefficient of about 5 ppm per degree C. In another embodiment, the chemically stable oxide is one or more of Rare Earth Disilicates ($RE_2Si_2O_7$) and Alkaline Earth Aluminosilicate. In another embodiment the oxide layer is Rare Earth Monosilicate ($RE_2SiO_5$).

The oxide layer is, in one embodiment, at least one rare-earth oxide-containing silicate compound containing an oxide of an element chosen from the group consisting of Sc, Y, La, Ce, Pr, Nd, Pm, Sm, Eu, Gd, Tb, Dy, Ho, Er, Tm, Yb, Lu, or combination thereof. In one embodiment, the oxide layer itself is graded with an inner layer and an outer layer, wherein said inner layer is chemically stable with silicon oxide and wherein said outer layer has a higher stability in water vapor environment than the inner layer. In another embodiment, the oxide layer closest to the substrate is the Rare Earth Disilicate ($RE_2Si_2O_7$) and the outer oxide layer is Rare Earth Monosilicate ($Re_2SiO_5$).

In one embodiment, the oxide layer comprises hafnium oxide and/or barium strontium aluminosilicate. In another embodiment, the porous oxide layer is from about 1 mil to about 50 mils thick. In one embodiment, the article is selected from the group consisting of combustor articles, turbine blades, shrouds, nozzles, heat shields and vanes.

One aspect of the present disclosure is directed to a gas turbine engine article comprising a substrate coated with a chemically stable porous oxide layer, wherein said porous oxide layer is from about 2 mil to about 50 mils thick and wherein said porous oxide layer protects the substrate from recession in hot gaseous environments.

In one embodiment, the substrate is selected from the group consisting of silicon nitride, silicon carbide, silicon oxinitride, a metal silicide, a ceramic matrix composite material, and combinations thereof. In another embodiment, the substrate comprises a SiC—SiC ceramic matrix composite material, and the porous oxide layer comprises Rare Earth Disilicates and/or Alkaline Earth Aluminosilicates.

In one embodiment, the porous oxide layer is created in situ during use by volatilization of a silicon-containing compound. In another embodiment, the porous oxide layer is created by volatilization of silicon from an oxide. In one embodiment, the oxide is a Rare Earth Disilicate ($RE_2Si_2O_7$), and during use of the article over time in hot gaseous environments, the Rare Earth Disilicate creates a porous Rare Earth Monosilicate ($RE_2SiO_5$). In one embodiment, the porous layer created in situ by volatization of silicon from a mixture of an oxide and a silicon-containing compound; wherein said silicon containing compound comprises silicon, silicon carbide, silicon nitride, or molybdenum silicide.

In one embodiment, the chemically stable porous oxide is one or more of Rare Earth Disilicates ($RE_2Si_2O_7$) and Alkaline Earth Aluminosilicate. In another embodiment, the oxide is Rare Earth Monosilicate ($RE_2SiO_5$). In one embodiment, an intermediate layer is used between the substrate and the oxide layer to improve the structural integrity of the substrate with the porous layer. In another embodiment, the intermediate layer comprises an oxide and silicon or a silicon-containing compound. In one example, this intermediate layer is in the form of a continuous network and volatilizes on exposure to water vapor environments leaving behind a porous oxide layer. In another embodiment, the intermediate layer is a two phase mixture of silicon or silicon carbide and a Rare Earth Disilicate. The intermediate layer, in one embodiment, is a two phase mixture of silicon nitride and a Rare Earth Monosilicate.

In one embodiment, the structure of an oxide and a silicon-containing compound is in the form of vertical arrays or a lattice array of the oxide and silicon or silicon-containing compound. In one embodiment, the vertical array of the silicon or silicon-containing compound is created by CVD. In another embodiment, the oxide layer is created by plasma spraying or a slurry coating process.

One aspect of the present disclosure is directed to a porous oxide layer comprising Rare Earth Disilicates and/or Rare Earth Monosilicates on a silicon containing ceramic matrix substrate, wherein said porous oxide layer is chemically stable and protects the silicon containing ceramic matrix substrate from rescission in hot gaseous environments.

Another aspect of the present disclosure is directed to a method for reducing the volatization of silicon away from a gas turbine engine article that contains silicon, said method comprising: a) providing an article comprising a silicon-containing ceramic or a ceramic matrix composite; b) providing an outer surface of said article which is in contact with gases at high temperatures during operation of the gas turbine engine article; and c) bonding a porous oxide layer to at least a portion of said outer surface of the article, such that the rate of volatization, at high temperatures, of silicon away from said outer surface of the article is reduced. In one example, high temperature comprises temperatures of 2200 F to 2800 F.

In one embodiment, the ceramic is selected from the group consisting of silicon nitride, silicon carbide, silicon oxinitride, a metal silicide, and combinations thereof. The ceramic, in one example, comprises a SiC—SiC ceramic matrix composite. In one embodiment, the substrate comprises a SiC—SiC ceramic matrix composite material, and the porous oxide layer comprises Rare Earth Disilicates and/or Rare Earth Monosilicates. In another embodiment, the porous oxide layer comprises Alkaline Earth alumino silicates. The article can be selected from the group consisting of combustor articles, turbine blades, shrouds, nozzles, heat shields and vanes.

These and other aspects, features, and advantages of this disclosure will become apparent from the following detailed description of the various aspects of the disclosure taken in conjunction with the accompanying drawings.

BRIEF DESCRIPTION OF THE FIGURES

The subject matter, which is regarded as the disclosure, is particularly pointed out and distinctly claimed in the claims at the conclusion of the specification. The foregoing and other features, aspects, and advantages of the disclosure will be readily understood from the following detailed description of aspects of the invention taken in conjunction with the accompanying drawings, wherein:

FIG. 13B is similar to FIG. 13A, except that there is an additional silicon layer between the CMC and the silicon and oxide layer.

FIG. 14B is similar to FIG. 14A, except that there is an additional silicon layer between the CMC and two phase silicon and oxide layer.

FIG. 15B is similar to FIG. 15A, except for the addition of oxide into the silicon carbide/silicon carbide CMC. FIG. 15C is similar to FIG. 15A, except for the addition of oxide only to the surface layer of CMC.

DETAILED DESCRIPTION

Figure 1:
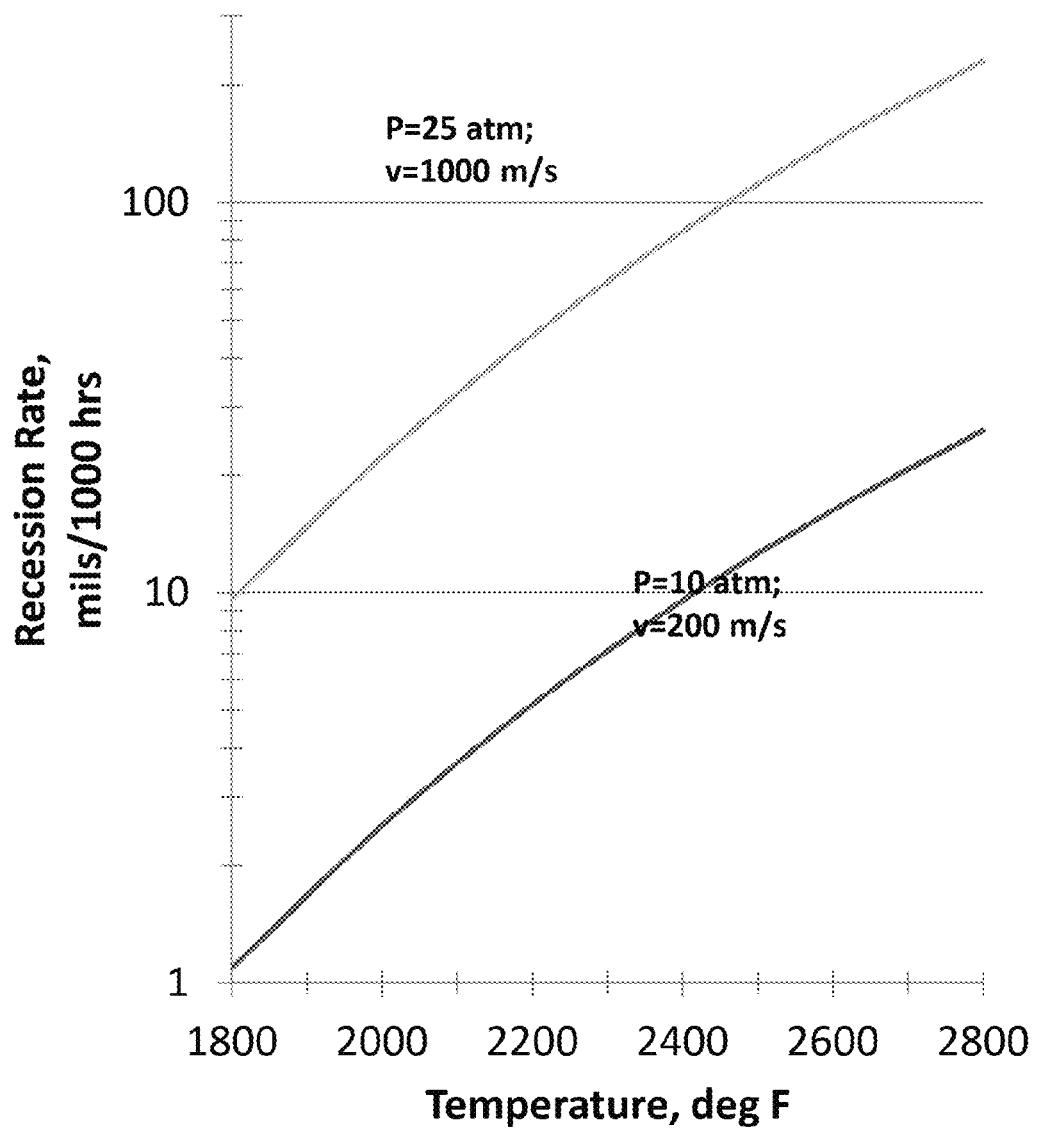
FIG. 1 shows the recession rate as a function of temperature for some typical turbine conditions using models by Smialek et al.

Reference will be made below in detail to exemplary embodiments of the invention, examples of which are illustrated in the accompanying drawings. Wherever possible, the same reference numerals used throughout the drawings refer to the same or like parts.

Ceramic matrix composites ("CMCs") are a class of materials that consist of a reinforcing material surrounded by a ceramic matrix phase. CMC materials comprise fiber reinforcement made of refractory fibers, typically carbon or ceramic fibers, and densified with a ceramic matrix, typically made of SiC. Such materials, along with certain monolithic ceramics (i.e. ceramic materials without a reinforcing material), are used for higher temperature applications.

One problem in using silicon-containing ceramics is the loss of thickness of the Ceramic resulting from the reaction of the ceramic with the moisture in the combustion gases. Environmental barrier coatings (EBCs) are used to protect the CMCs from the loss of thickness or the recession of the ceramic caused by volatilization; these EBCs are multi-layer coatings with a bond coat of silicon or silicon-containing material. CMCs can also be coated with Thermal Barrier Coatings (TBCs), which provide protection to the substrate by reducing its temperature by a thermal gradient across the TBC. In some cases, EBC can also serve as a TBC.

Another problem in using the silicon-containing bond coat on EBCs is that silicon melts at a temperature of about 2570 F and cannot be used at higher temperatures. Other silicon-containing compounds, such as silicon carbide or silicon nitride form gaseous carbon oxides and nitrogen, which destroy the integrity of the EBC. The inventor of the instant disclosure has discovered, contrary to the common wisdom, that a porous oxide layer can reduce the recession rate by more than an order of magnitude.

Yet another problem in using an EBC is its spallation. EBCs typically develop local spalls, caused by foreign object damage or handling damage. For most hot stage articles, it is believed that this results in high volatilization rates locally in the region of spalls resulting in the formation of holes in the CMC articles, and in turn causing recession of the CMC over time. This recession of the CMCs is considered one of the main obstacles in commercialization of CMCs. Modeling and experiments indicate that EBC spallation in some regions of engine articles can lead to burn through of the CMC. The ceramic community has been working for years to solve this problem. As such, the gas turbine and aerospace industries are continuously looking for new and improved CMCs and related articles and processes.

Yet another problem with the use of CMCs is that all of the constituents of the CMCs are subject to volatilization and recession. The inventor of the instant application has discovered that the addition of oxides to the matrix of the CMCs can reduce their recession rate.

A Porous Oxide Layer

Under operating conditions of a gas turbine engine, whether used for power generation or aircraft engines, recession of the SiC present in the turbine engine article occurs. There are empirical/semi-empirical models for use in the study of recession, based on velocity correlations. One equation that has been used is from NASA by Smialek et al. The volatilization rate can be expressed under the oxidizing conditions by the following equation:

$$\text{Recession Rate } (\text{mg.cm}^{-2}.\text{hr}^{-1}) = 2.04 \ P^{1.5} v^{0.5} \exp\left(-\frac{108 \text{ kJ/mole}}{RT}\right) \quad (1)$$

The above equation was derived for a φ value of 0.78-0.94, which corresponds to an average water vapor content of about 10.5%. Here, φ is the ratio of fuel to air expressed relative to the stoichiometric combustion which corresponds to a φ value of 1, T is temperature in °K, and v is the gas velocity in msec. The recession rate was observed to vary as the square of the water vapor content. The above equation then can be expressed as $$\text{Recession Rate (mils/1000 hrs)} = \quad (2)$$
$$21200 \cdot X_{H_2O}^2 \cdot P^{1.5} v^{0.5} \exp\left(-\frac{108 \text{ kJ/mole}}{RT}\right)$$

Here, $X_{H_2O}$ is the mole fraction of water vapor. The above equation was derived using testing on flat samples under laminar flow conditions. The gas turbine articles are much more complex in shape, and consequently equations based on flat plate geometry are not appropriate. Moreover, the flow conditions during gas turbine operation are turbulent. Nevertheless, no one has developed equations for recession in turbine conditions, and the above equation is used for turbine operation.

FIG. 1 shows the results of calculations for typical conditions in gas turbines, using equation (2). A water vapor content of 6% was used for these calculations. The recession rates are very high and can exceed even 100 mils per 1000 hrs. For comparison, the typical thicknesses of gas turbine articles are of the order of 100 mils and the lives required are of the order of tens of thousands of hours. The turbine conditions are complex, both in terms of the shape of the articles as well as flow conditions. The inventor of the instant application developed the following equation for predicting recession under the turbine conditions $$\text{Recession Rate (mils/1000 hrs)} = 100.2 \cdot X_{H_2O}^2 \cdot hP \exp\left(-\frac{6823}{T}\right) \quad (3)$$

Here, $X_{H_2O}$ is the mole fraction of water vapor, h is the heat transfer coefficient in BTU·h$^{-1}$ ft$^{-2}$°F$^{-1}$, P is the pressure in atm, and T is the temperature in °K. The above equation was developed using Reynold's analogy between the heat and mass transfer. The water vapor level depends on the type of fuel and air to fuel ratio and can range from 4% to as high as 19%.

The heat transfer coefficient depends upon the component of the turbine. For land-based gas turbines the operating conditions do not change significantly. However, for aircraft engines, the conditions change drastically from takeoff to climb to cruise conditions. Typically, the pressure and heat transfer coefficients are highest for the takeoff conditions and lowest for the cruise conditions.

Figure 2:
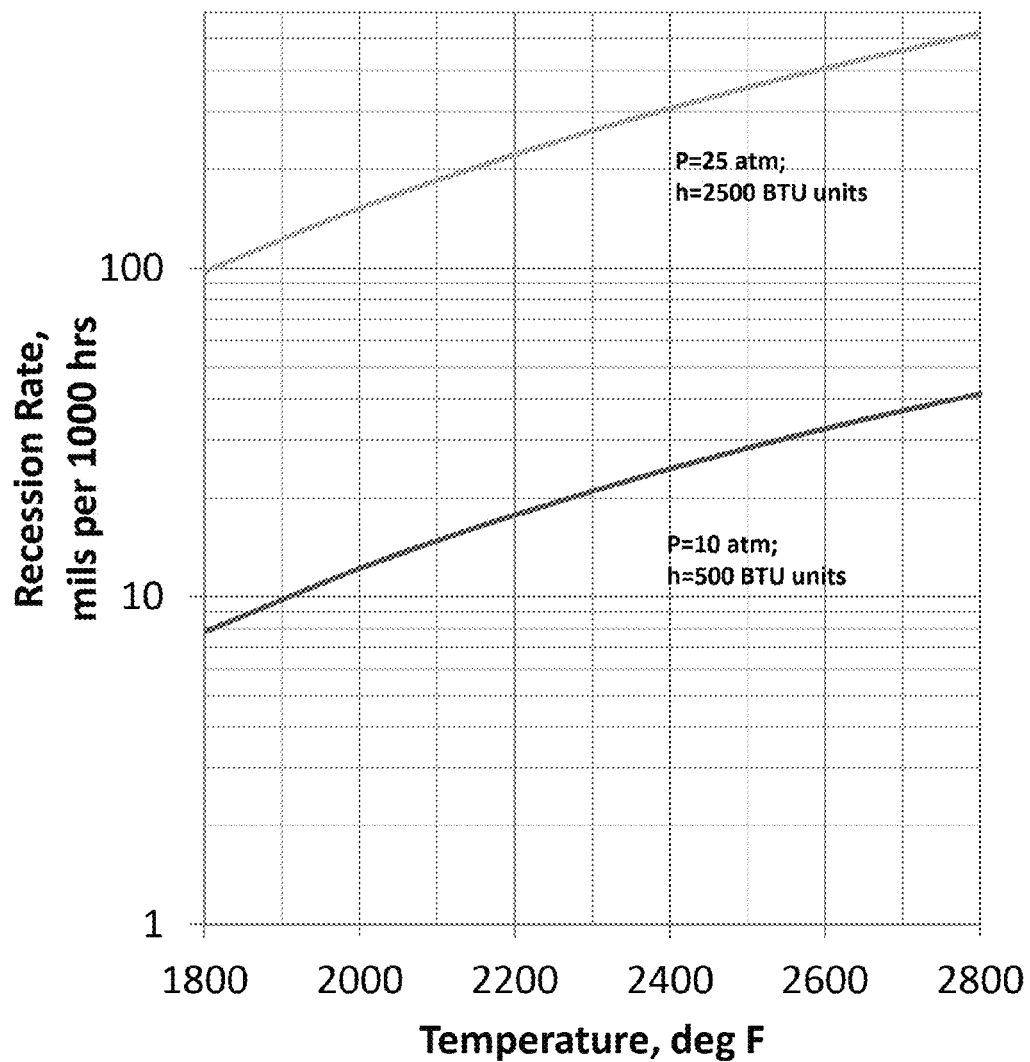
FIG. 2 shows recession rate as a function of temperature for some typical turbine conditions using models developed by current inventors for turbulent flow conditions for gas turbines.

FIG. 2 shows the recession rate in mils per 1000 hours for some turbine operating conditions, as calculated in equation (3). At a high pressure of 25 atm and a heat transfer coefficient of 2500 (typical of some aircraft engine takeoff conditions), the recession rates can be extremely high, up to hundreds of mils per 1000 hrs. Again, a water vapor content of 6% was used for these calculations. Note that the total thickness of the gas turbine article can be of the order of 100 mils or so. Some advanced future turbine articles would operate under conditions of higher pressures and higher heat transfer, where the recession rates are expected to be even higher.

EBCs are used to protect silicon-containing ceramics against recession. On oxidation, silicon carbide forms carbon oxides which destroy the integrity of the EBCs. Therefore, Applicants developed coatings that use silicon as a bond coat (U.S. Pat. No. 6,299,988, incorporated herein by reference). However, silicon melts at about 2570 F and softens at even lower temperatures. Therefore, the inventor of the instant application saw the need for another coating system for temperatures over about 2500 F.

In order to solve the recession problem, the inventor of the instant application conceived of a new and highly surprising way of overcoming this recession problem. The inventor of the instant application discovered that, contrary to conventional wisdom in the art, oxide films that are porous in nature can be used to reduce the recession of ceramic matrix composites caused by volatilization of silicon as silicon hydroxide.

Figure 3:
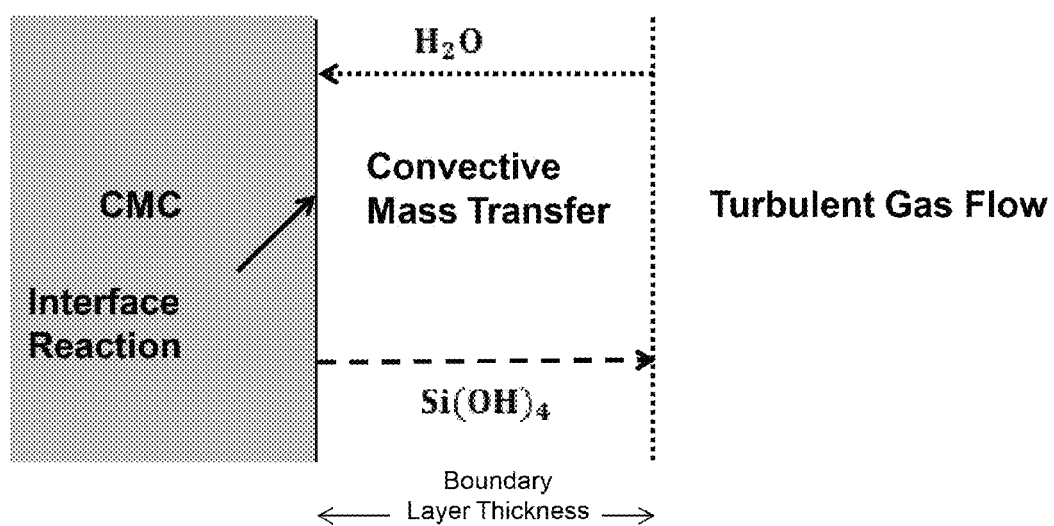
FIG. 3 shows a schematic representation of the mechanism of recession of a SiC/SiC composite.

FIG. 3 shows a schematic representation of various rate limiting steps during the gas phase mass transport. Interface reactions are generally fairly rapid, and it is reasonable to assume that the rate is limited by gas phase transport. However, it is possible that under takeoff conditions, where the heat transfer and mass transfer coefficients are extremely high, the interface reaction might play a role and reduce the recession rate. Hot stage articles of gas turbines are exposed to turbulent gas flow conditions where the volatilization primarily occurs by convective flow. The volatilization or recession rate under the turbine conditions is believed to be controlled by gas phase mass transport. The partial pressure of water vapor is orders of magnitude higher than that of silicon hydroxides. Consequently, the volatilization (recession) cannot be controlled by water vapor transport. The rate limiting step must either be the interface reaction of the water vapor with silica and/or the transport rate of silicon hydroxide away from the silica/gas interface. Under most turbine operating conditions, the rate is expected to be controlled by gas phase diffusion; that is transport of silicon hydroxide away from the silica/gas interface. However, under some extreme aircraft engine takeoff conditions, the recession rates can be so high that the recession rate might be slowed down by the interface reaction, and the recession rates might be lower than those predicted by equations 1 to 3.

Under most conditions observed to date, the rate of volatilization is believed to be controlled by gas phase diffusion. Under laboratory conditions, the velocities are very low, and consequently the flow is laminar. However, under turbine conditions, flow is turbulent, and the volatilization occurs by convective mass transport, as shown schematically in FIG. 3. Under turbine conditions, the effective boundary layer thickness is $$\delta_{eff}(\text{cm}) = \frac{0.0172\ T^{0.5}}{h} \tag{4}$$

The inventor obtained this equation using Reynold's analogy and by estimating diffusion coefficient of silicon hydroxide.

Figure 4:
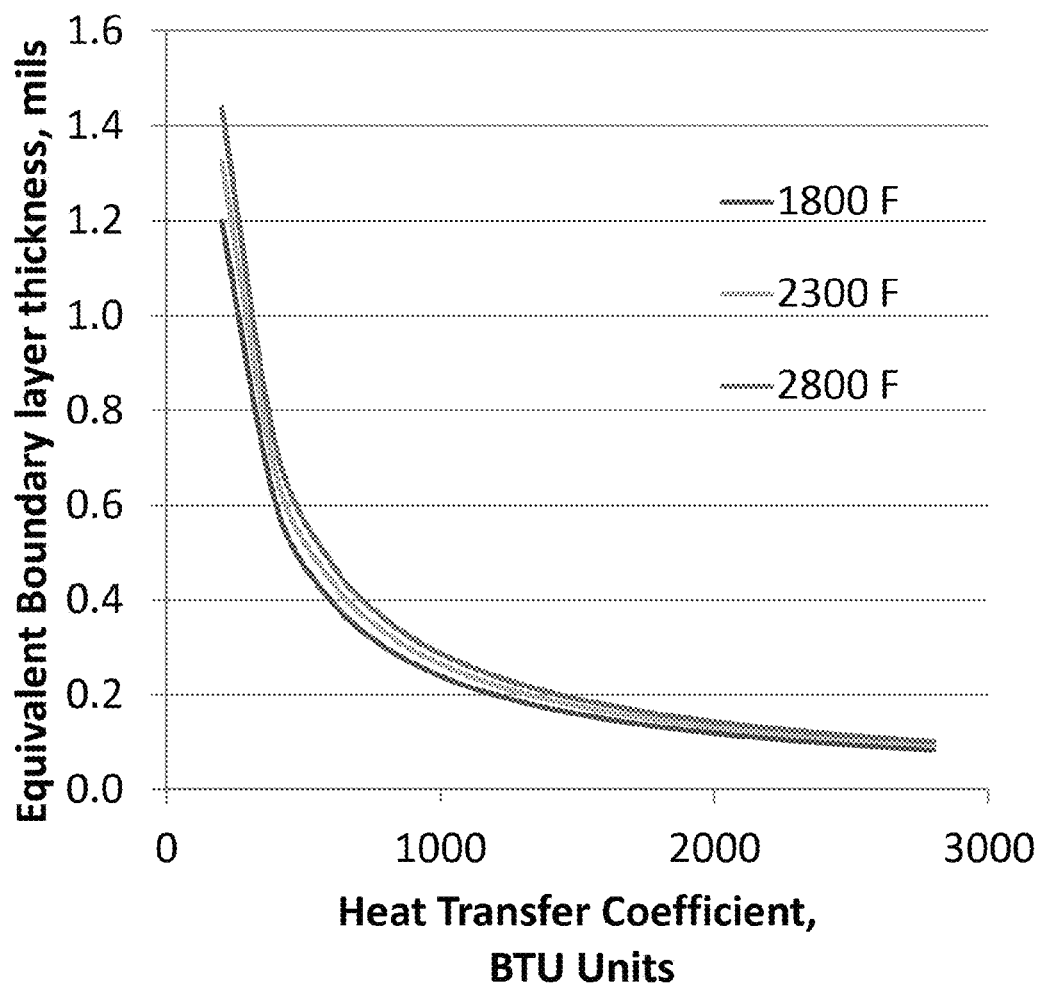
FIG. 4 shows the equivalent boundary layer thickness as a function of heat transfer coefficient expressed in BTU units ($BTU \cdot h^{-1} \cdot ft^{-2} \cdot °F.^{-1}$) for mass transfer of $Si(OH)_4$ from the CMC surface to combustion gases.

FIG. 4 shows the effective boundary layer thickness as a function of heat transfer coefficient. The effective boundary layer thickness is small, of the order of 0.1 to 0.5 mils for high heat transfer coefficients of interest in hot sections of gas turbines (a few hundred to a few thousands, e.g., 500-3000 BTU units). The inventor, when confronted with this surprising result, developed a new coating concept which is contrary to the use of dense coatings in the turbine.

As a result, in one example, the instant disclosure teaches that a porous layer that is significantly larger than the effective boundary layer thickness (see FIG. 5) would act as a diffusion barrier layer and reduce the recession rate of the underlying substrate. In one embodiment, the effectiveness of the porous layer is more than would be expected from just the thickness effect because the porosity in the porous layer also reduces the cross-sectional area through which diffusion can occur as well as the tortuosity of the diffusion path. As a first order approximation, the effective diffusion distance for a porous layer can be expressed as $$x_{eff} = x_p \cdot \frac{\tau_p}{f_p} \tag{5}$$

Here, $x_p$ is the thickness of the porous layer, $f_p$ is the volume fraction of the pores in the porous layer, $\tau_p$ is the tortuosity of the porous layer. Therefore, for example a porous layer with 25% porosity and a tortuosity factor of 2 to 4, and a thickness of 5 mils would have an effective thickness of 40 to 80 mils which is over about 100 times larger than the 0.1 to 0.5 mil diffusion distance under the turbine conditions. Therefore, the recession rate correspondingly reduces by a factor of over about 100.

Figure 6:
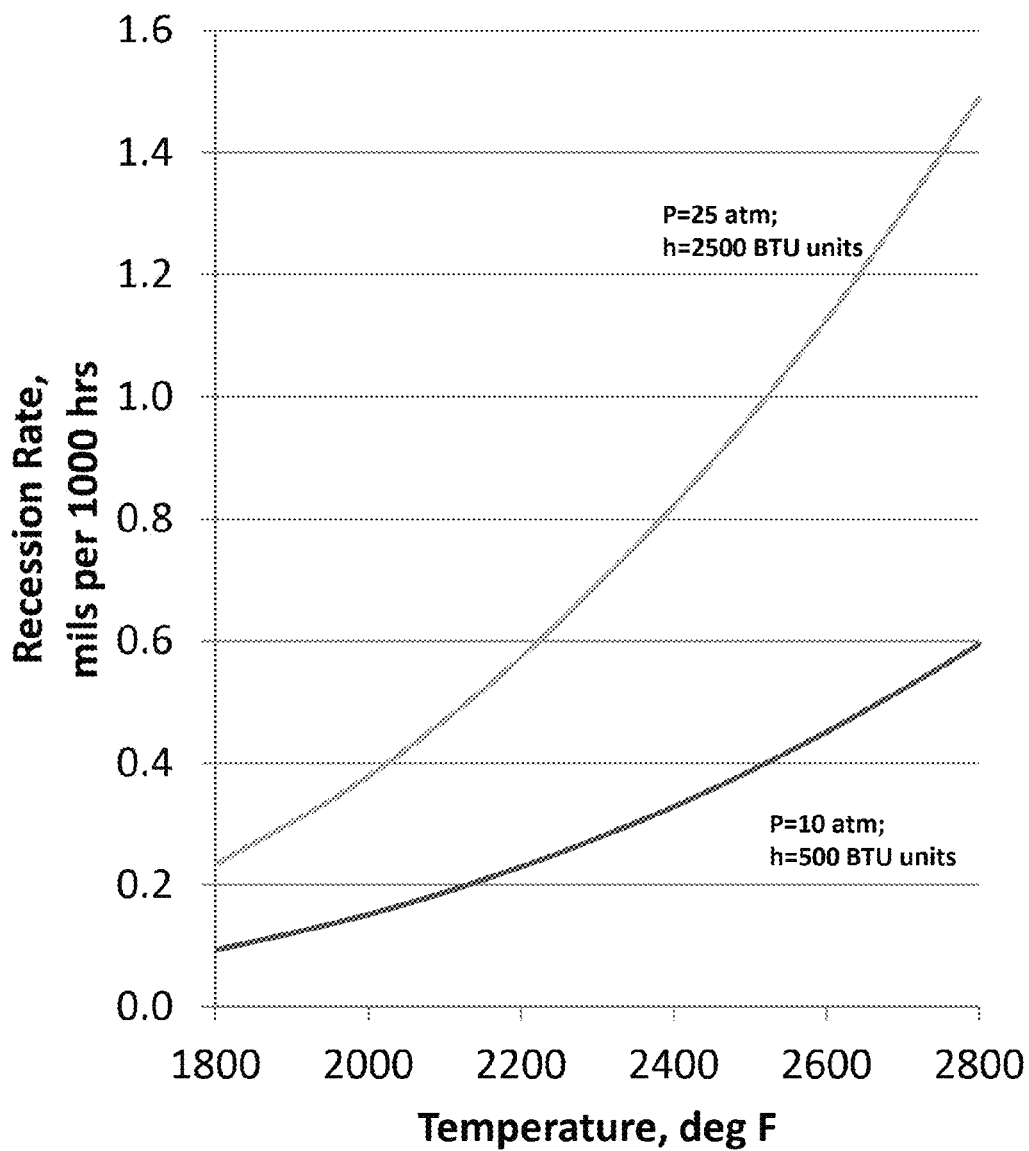
FIG. 6 shows recession of an SiC substrate underneath a porous oxide film 5 mil thick with 25% porosity.

This is further illustrated by calculations in FIG. 6. A porosity of 25% and a conservative tortuosity factor of 2 was used for FIG. 6. The heat transfer coefficient and pressure conditions for FIG. 6 were similar to those for recession prediction without the porous layer in FIG. 2. A comparison of the two figures shows that the presence of the porous layer reduces the recession rate by a factor of 100 or more, to acceptable levels of about one mil per 1000 hours.

As such, one aspect of the present disclosure is directed to a recession resistant gas turbine engine article, comprising a silicon containing substrate coated with a chemically stable porous oxide layer. The substrate may comprise a SiC—SiC ceramic matrix composite.

SiC—SiC ceramic matrix composite means, for example, SiC fiber reinforced SiC matrix composites. Such composites include composites where a significant fraction of the matrix is SiC and for example include Si—SiC matrix composites. These composites can be made by melt infiltration or chemical vapor infiltration or by polymer pyrolysis. In one example, the matrix comprises silicon carbide. The silicon carbide fibers are meant to include all commercially available fibers known as silicon carbide fibers, which comprise silicon carbide and may also contain other elements, such as oxygen, nitrogen, aluminum, and others. Examples of known silicon carbide fibers are the NICA- LON™ family of silicon carbide fibers available from Nippon Carbon, Japan; Sylramic™ silicon carbide fibers available from COI/ATK, Utah the Tyranno™ family of fibers available from UBE Industries, Japan; and fibers having the trade name SCS-6 or SCS-Ultra produced by Specialty Materials, Inc., Massachusetts.

In one embodiment, the porous oxide layer has a continuous network of dislicate(s) (DS) so that the layer is rigid and adherent when silicon volatilizes away. The desired characteristics for the DiSilicate may include, 1) its expansion coefficient is similar to that of the silicon, and 2) the resulting monosilicate has small volume change (e.g. about 25%). For example, the yttrium and ytterbium disilicates have expansion coefficients that are similar to that of silicon; their monsilicates have higher expansion coefficients. Several Alkaline Earth Aluminosilicates also have an expansion coefficient that is similar to the SiC/SiC composites and silicon. Barium strontium aluminosilicate is one such example.

Figure 5:
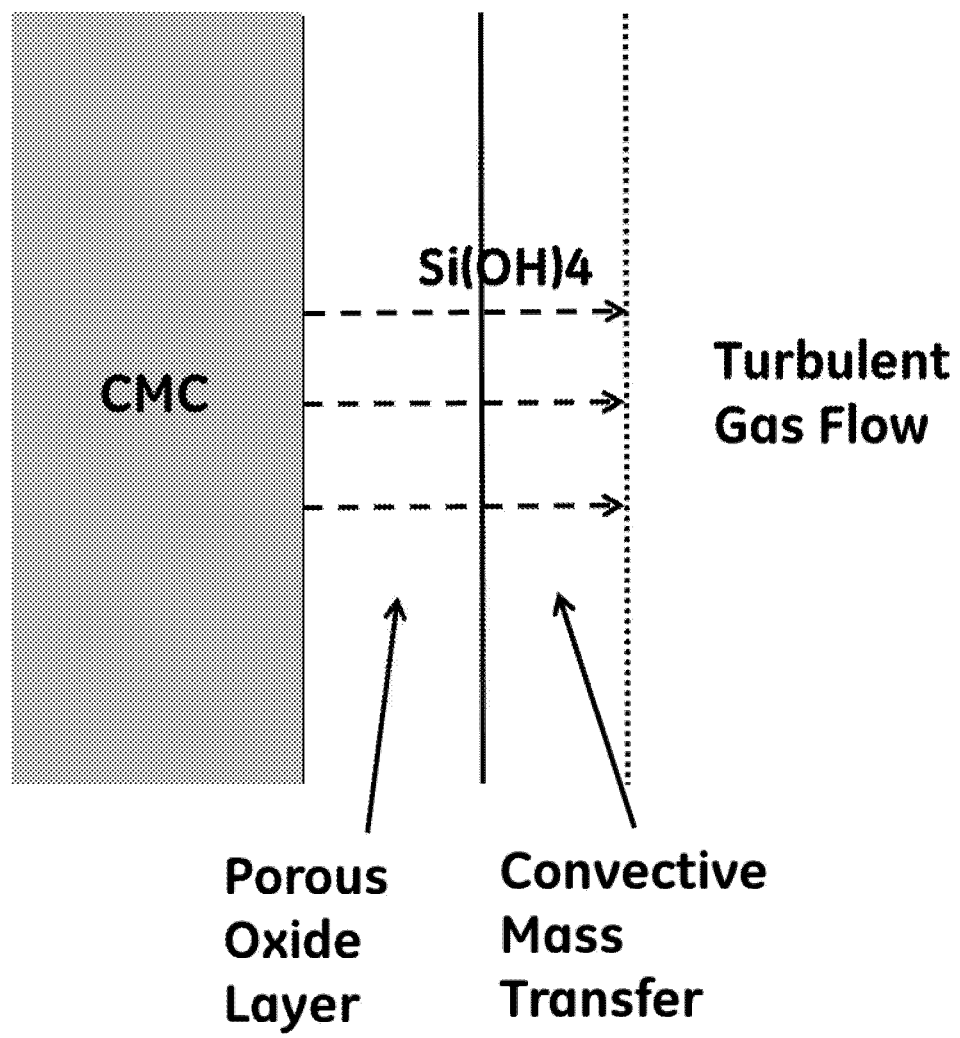
FIG. 5 shows a schematic representation of the transport of $Si(OH)_4$ across a porous oxide layer into the turbulent gas flow. The region represented by convective mass transfer shows the equivalent boundary layer thickness of the turbulent gas flow.

In FIG. 5, if the thickness of the porous layer is smaller than the thickness of the boundary layer, there would be little or limited benefits of the porous layer (see FIGS. 3 and 5). For example, in most laboratory conditions, the heat transfer coefficient is very low, and the boundary layer thickness is very large (of the order of hundreds of mils). Under these conditions, the benefits of a typical porous layer, of the order of 2 mils to 50 mils, would be rather limited. Therefore, testing of the benefits of the porous layer to confirm its benefits needs to be performed under conditions representative of the turbine operation.

In the present disclosure, by using a chemically stable porous oxide layer (e.g. a chemically stable porous Rare Earth Disilicate layer), the volatization rate of silica from, for example, the ceramic substrate is reduced by the mechanism discussed (i.e., the volatilization rate reduces because the rate limiting step changes from convective mass transport through the turbulent flow to gas phase diffusion controlled through the porous layer). There are several ways to make the porous layer. The porous layer can be made by depositing a porous layer of an oxide, such as a Rare Earth Disilicate (REDS), a Rare Earth Monosilicate (REMS) or an Alkaline Earth Aluminosilicate. The porous layer can also be made in situ. For example, the porous layer can be made by depositing a two phase mixture of REDS and a silicon carbide or silicon and a REMS and silicon nitride. On exposure to the combustion environments, the silicon-containing phase volatilizes away leaving behind the porous REDS layer. In the mean time, the recession of the substrate does not start until the silicon phase is substantially gone, as long as the two phase layer is dense. Thus, the presence of the two phase layer provides additional time before the recession of the substrate starts by diffusion through the porous layer.

The present disclosure, in one example, provides adequate life to the CMCs by using an EBC that relies on a totally different approach for alleviating volatilization of silicon from the substrate. Existing systems rely on a silicon bond layer to prevent the oxygen from reaching the CMC substrate (U.S. Pat. No. 6,299,988, incorporated herein by reference) and the outside dense oxide layers provide resistance against volatilization of silicon bond layer. In the absence of the silicon layer, oxygen reaches the CMC substrate and forms gaseous carbon oxides, which destroy the integrity of the overlay oxide layers of the EBC.

The present disclosure recognizes that gaseous carbon oxides formation is a problem and addresses it by creating a layered structure that reduces the volatilization of silicon hydroxide by creating a porous structure that has adequate resistance to provide the desired life and has enough porosity to allow gaseous carbon oxides (or nitrogen) to escape without disrupting the integrity of the oxide film. The inventor of the instant application here uses a two phase mixture of a silicon compound and an oxide that has enough volatilization resistance against water vapor. The purpose of the silicon compound is to provide gettering for the oxygen and water vapor. The purpose of the oxide is to create a skeleton of porous oxide on the surface.

Therefore, one aspect of the present disclosure is directed to a gas turbine engine article comprising a substrate coated with a chemically stable porous oxide layer, wherein said porous oxide layer is from about 2 mil to about 50 mils thick and wherein said porous oxide layer protects the substrate from recession in hot gaseous environments. In one example, the porosity of the porous layer is from about 5% to about 50%. In one embodiment, the porosity of the porous layer is from about 10% to about 35%. In one embodiment, the porosity of the porous layer is from about 20% to about 30%. The desired porosity may depend upon the expansion coefficient of the oxide layer and also whether it goes through further changes in porosity on exposure to the water vapor environments. In one embodiment, the porosity is low (for example about 10%) in order to reduce recession, however, the porosity is interconnected.

For the purposes of this disclosure, porous layer is assumed to include the layers that may have interconnected pores as well as interconnected cracks or combination of the two. It is a layer through which gases can diffuse by gas phase diffusion. The porous layer concept was developed by the inventor to address the limitations of EBCs based on silicon based bond coats for applications above about 2550 F. However, the new coatings can also be useful at lower temperatures. Modifications can also be used to provide life to the CMC/EBC system where the EBC coating spalls of locally. It can also be used in a modified form to increase the recession resistance of the CMC substrate. Many of the oxides that are used to improve the recession resistance are similar for all three concepts. Therefore, they will not be repeated in each of the following sections.

1. Porous Oxide Layer for EBC to Reduce the Recession Rate of the Substrate

The present disclosure also teaches that a porous oxide layer can be used for environmental barrier coating and in order to reduce the recession rate of the underlying substrate.

As well as ceramics, metals are also used for high temperature applications, including the hot sections of gas turbines. On exposure to oxidizing environments at high temperatures, these ceramics and metals materials oxidize to form oxides. Oxidation of silicon-containing substrates involves the formation of various gaseous products. For example, the following equations demonstrate the attack on silicon carbide (SiC) and silicon nitride ($Si_3N_4$):

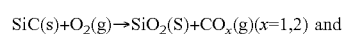
$$SiC(s)+O_2(g) \rightarrow SiO_2(S)+CO_x(g)(x=1,2) \text{ and}$$

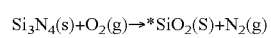
$$Si_3N_4(s)+O_2(g) \rightarrow *SiO_2(S)+N_2(g)$$

Carbon oxides ($CO_x$) and $N_2$ gases have low solubility and diffusivity in many oxides and can get trapped at the external coating/substrate interface to form voids. The pressure of the gases in the voids can be sufficiently high at elevated temperatures to cause bursting. Voids can also interconnect to form large unbounded interfacial regions that result in spallation.

CMC and monolithic ceramic articles can be coated with environmental barrier coatings (EBCs) and/or thermal barrier coatings (TBCs) to protect them from the harsh environment of high temperature engine sections. EBCs can provide a dense, hermetic seal against the corrosive gases in the hot combustion environment. TBCs, on the other hand, are generally used to reduce the temperature of the substrate. In some cases, EBCs can also serve as TBCs.

In one aspect, the present disclosure uses a new concept for the EBCs. The inventor of the instant application discovered using a two phase barrier layer of a silicon-containing compound with a melting temperature over 2700 F and an oxide in ratios that leads to an overall expansion coefficient of between 4 and 6. The selected oxide has resistance to volatilization for the intended application. Local spallation of the EBC can still occur substantially at the interface between the silicon bond coat and the outside oxide EBC. The oxide in the silicon-oxide layer is stable under the water vapor environments of the gas turbine. Reaction of the water vapor with the oxide is such that the changes still keep the integrity of the porous oxide layer.

In a corrosive atmosphere (oxidizing atmosphere, in particular in the presence of moisture) and when CMC materials with a SiC matrix are used, a phenomenon of the surface retreating is observed. This surface retreating or recession phenomenon is observed because the silica (SiO2) forms by oxidation on the surface of the CMC material and is then volatilized. One problem in using silicon carbide ceramics is the loss of thickness of the CMC resulting from the reaction of the ceramic with the moisture in the combustion gases.

In one example, SiC/SiC composites provide protection against oxidation by formation of a dense silicon oxide film. In the presence of water vapor in combustion gases, silicon oxide volatilizes as silicon hydroxide reducing the thickness of the SiC articles, a problem called recession of SiC thickness by volatilization of silicon hydroxides. Engine test experience to date shows that the oxide layers of EBC can locally spall, usually at the silicon-oxide interface.

Heat transfer calculations indicate that in the presence of a TBC spall the local heat transfer conditions are similar to those on the surface of the article. If the heat transfer conditions in the spalled region are similar to those on the surface, the recession rate of the substrate would be unacceptably high, and could lead to formation of holes in the CMC articles in spalled regions. Recession of the CMC and resulting formation of holes in the CMC article is considered to be a major obstacle in commercialization of CMCs.

The inventor of the instant application found, inter alia, a new way to alleviate the recession of the underlying substrate when the coating spalls. As such, the present disclosure increases the time before the CMC recesses to the point of hole formation or burn through. The inventor of the instant application discovered, inter alia, that a chemically stable porous oxide layer can be used to reduce the recession rate when EBC spalls (see FIG. 7). This can be achieved in a number of ways, and several different oxides can be used. REDS offer a good choice because the volume change on conversion to the monosilicates is small (about 25%). The expansion coefficient of REMS is high ($7.5 \times 10^{-6}/^\circ$ C. compared to about $5 \times 10-6/^\circ$ C. for REDS and SiC). In one embodiment, it is the porosity in REMS that prevents spallation.

Therefore, one aspect of the present disclosure is directed to a recession resistant gas turbine engine article, comprising a silicon containing substrate coated with a chemically stable porous oxide layer. The substrate may comprise a SiC—SiC ceramic matrix composite. As exemplified in FIG. 7, the present disclosure also teaches a gas turbine engine article comprising a substrate coated with about 2 mil to about 50 mils of a thick, chemically stable porous oxide layer. This porous oxide layer acts to protect the substrate from recession in hot gaseous environments. The chemically stable porous oxide may be one or more of Rare Earth Disilicates ($RE_2Si_2O_7$), Alkaline Earth Aluminosilicate, and Rare Earth Monosilicate ($RE_2SiO_5$). The porous layer can contain porosity of about 5 to 50%. The porosity of the layer may also be graded to provide mechanical structural integrity to the substrate/coating interface.

The porous oxide coating layer may also be formed in situ by starting with a two phase mixture of silicon nitride and a Rare Earth Monosilicate. A two phase mixture of Rare Earth Disilicate and silicon carbide and/or silicon also meets the requirements for some applications. The amount of silicon nitride and/or silicon and/or silicon carbide may be as low as possible and is interconnected. A mixture of Hafnium oxide with silicon nitride and/or silicon carbide also meets these requirements. The two phase coating of the silicon-containing compound may be overcoated with a porous coating of Rare Earth Monosilicate or Hafnium oxide.

Figure 7:
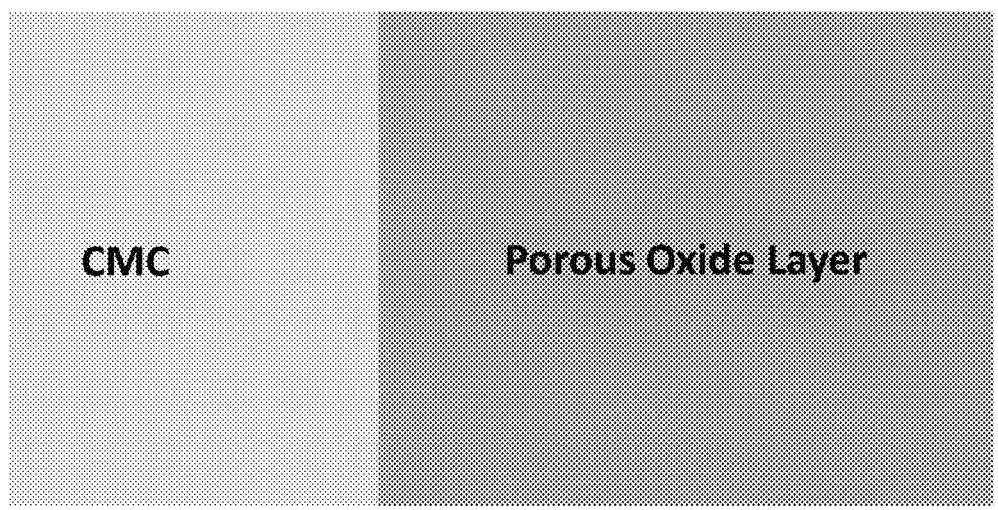
FIG. 7 shows a schematic representation of an EBC based on a single porous oxide layer.

FIG. 7 shows an example of the architecture for the porous layer, comprising a single porous layer, preferably of a Rare Earth Monosilicate (REMS), which is fairly stable under the turbine conditions. The layer contains minimum porosity. However, REMS have higher expansion coefficients (about 7-8 ppm/° C.) in comparison to the substrate, e.g. ceramic matrix composite, (about 5 ppm/° C.). Therefore, in one embodiment, the inventor conceived that the mono-silicate layer needs some porosity to keep it adherent to the substrate.

Many other oxides can be used instead of REMS. The oxides should be thermally stable under the water vapor environment. Instead of a REMS, a Rare Earth Disilicate (REDS) layer can also be used, which have better expansion match with the substrate. However, the REDS would decompose to form Rare Earth Monosilicate with time, creating some additional porosity. Another oxide example is hafnia, which has expansion coefficient similar to that of REMS or lower.

The Rare Earth Silicate oxide layer can be at least one rare-earth oxide-containing compound containing an oxide of an element chosen from the group consisting of Sc, Y, La, Ce, Pr, Nd, Pm, Sm, Eu, Gd, Tb, Dy, Ho, Er, Tm, Yb, and/or Lu. One or more combinations may be used. In another example, the oxide layer comprises hafnium oxide and/or barium strontium aluminosilicate. The oxide layer itself can be graded with an inner layer and an outer layer, such that the inner layer is chemically stable with silicon oxide and the outer layer has a higher stability in water vapor environment than the inner layer. In one example, the oxide layer closest to the substrate is the Rare Earth Disilicate ($RE_2Si_2O_7$) and the outer oxide layer is Rare Earth Monosilicate ($Re_2SiO_5$). On oxidation of the two phase silicon carbide (or silicon nitride) and rare earth silicate layer, the resulting layer would be a porous monosilicate layer. On oxidation of the two phase silicon carbide (or silicon nitride) and hafnia layer, the resulting oxide would be a porous hafnia layer. The porosity of the resulting Rare Earth Monosilicate or hafnia layer may be high. Therefore, in this example, it is desirable to use an outer layer of porous rare earth monosilicate or hafnia on top of the two phase layer. The outer layer has continuous porosity, in one example, and as low a porosity as possible but sufficiently high enough to provide resistance against spallation.

Figure 8:
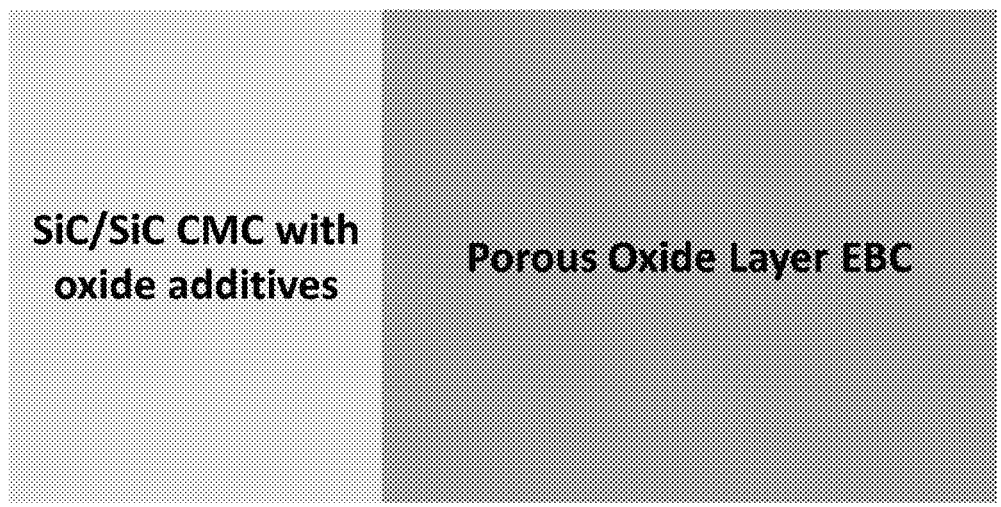
FIG. 8 shows a schematic representation of SiC/SiC CMC with oxide additives to reduce the recession rate of CMC underneath a porous layer and to provide improved structural integrity to the CMC/oxide layer interface.

The recession of the underlying substrate, even though it is very slow, can lead to a gap or voids at the SiC/porous oxide layer. If this gap forms, it would reduce the adhesion of the porous layer to the substrate causing it to spall. Some of this gap can be filled with a mixture of amorphous and crystalline silica. Crystalline silica would form because water vapor can diffuse through the porous layer and crystallize silica. One advantage of this silica is that it would further reduce the transport rate of silicon hydroxide diffusing out. However, this silica is not expected to be dense and may not be enough to keep the porous oxide adherent on the surface. The inventor of the instant application conceived that one way to improve the integrity of the CMC/EBC interface is to dope the CMC surface with oxides, such as Rare Earth oxides or Alkaline Earth Oxides, which are stable in water vapor environments (see FIG. 8).

The geometry of the oxide layer on the silicon-containing compound may take the form of a number of ordered or random patterns. For example, the structure of an oxide and a silicon-containing compound can be in the form of vertical arrays or a lattice array of the oxide and silicon or silicon-containing compound. The vertical array of the silicon or silicon-containing compound may be created by CVD; the oxide layer may be created by plasma spraying or a slurry coating process.

On exposure to water vapor diffusing through the porous oxide, silicon carbide would react with water vapor to form gaseous silicon hydroxide and silica. Consequently, the CMC/coating interface would be a mixture of Rare Earth oxides, amorphous silica, crystalline silica, and porosity, which has better integrity than the interface without the addition of oxide particles to the matrix. This approach can be used by itself and/or in combination with modified coating architectures aimed at improving the structural integrity of the CMC/EBC interface.

Figure 9:
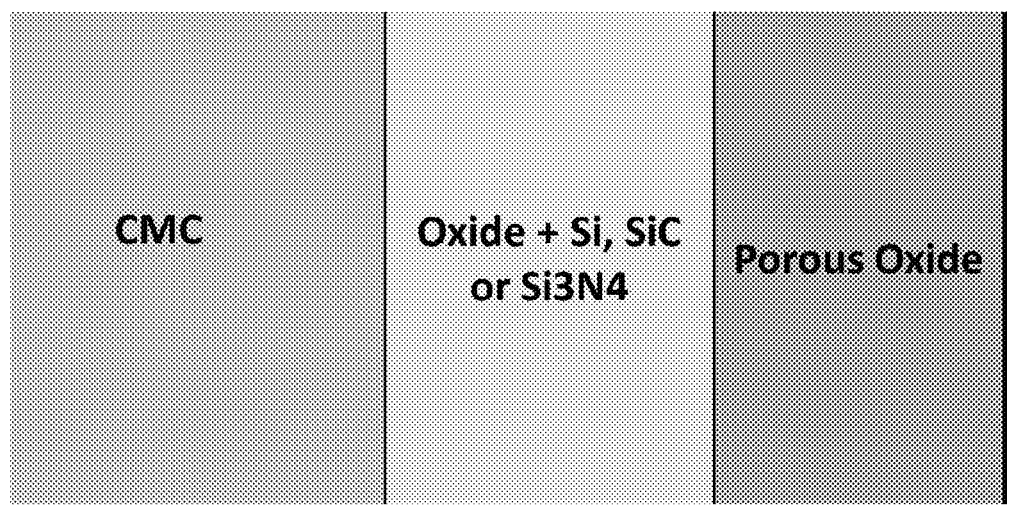
FIG. 9 shows a schematic representation of a coating architecture to reduce the recession rate of the CMC interface and also to provide improved structural integrity to the CMC/coating interface for resistance against spallation caused by recession of the CMC substrate.

FIG. 9 shows a coating architecture that uses a coating that comprises a mixture of Rare Earth oxide and a silicon-containing compound, such as Si, SiC, or $Si_3N_4$. Clearly, silicon can only be used for applications below the melting temperature of silicon. On exposure to water vapor, the silicon-containing compound would volatilize leaving behind rare-earth oxide. It would, therefore, be desirable to have continuous networks of oxide and silicon-containing phases.

The substrate or ceramic matrix composite comprises a SiC—SiC ceramic matrix composite material, and the porous oxide layer comprises REDs and/or Alkaline Earth Aluminosilicates, in one example. Regardless of composition or substrate, most coatings are generally applied using one of conventional air-plasma spraying (APS), slurry dipping, chemical vapor deposition (CVD), or electron beam physical vapor deposition (EBPVD).

Figure 10:
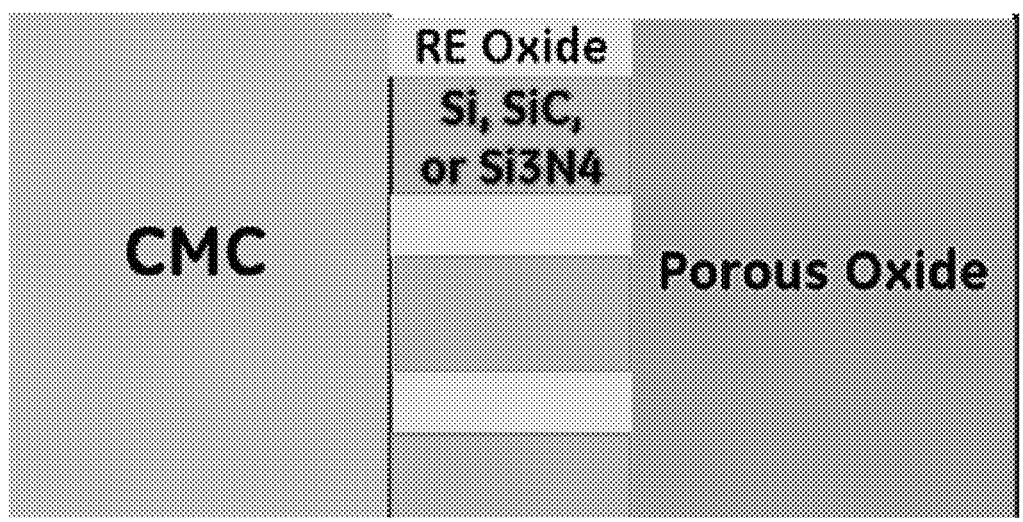
FIG. 10 shows a schematic representation of a coating architecture to reduce the recession rate of the CMC interface and also to provide improved structural integrity to the CMC/coating interface for resistance against spallation caused by recession of the CMC substrate.

FIG. 10 shows an example of an architecture that improves the mechanical integrity of the CMC/Coating interface further. In this example, Rare Earth Oxide is applied by a pattern, such as a parallel array, vertical array, a diamond pattern or the like, and the remaining spaces can be filled by a silicon-containing compound by CVD. The remaining spaces can also be filled by a two phase mixture of oxide and the silicon compound. This coating architecture provides better mechanical integrity to the CMC/coating interface because of continuity of the oxide phase.

There are several choices for the constituents of the two phase layers. In one example, a combination of silicon or silicon carbide with Rare Earth Disilicates ("REDs") is used because both have similar expansion coefficients and match with the substrate. However, the Rare Earth Disilicate is not stable under the water vapor environments in combustion gases and decomposes to Rare Earth Monosilicate with a volume decrease of about 25%. Therefore, in one example, the inventor uses a mixture of Rare Earth Monosilicate and Silicon nitride. The expansion coefficient of Rare Earth Monosilicate is higher than that of the CMC while that of the silicon nitride is lower than that of the CMC; as such, a mixture provides a good match to the CMC expansion coefficient.

The present disclosure is also directed to a porous oxide layer comprising REDs and/or Rare Earth Monosilicates ("REMs") on a silicon containing ceramic matrix substrate. The porous oxide layer is chemically stable and protects the silicon containing ceramic matrix substrate from rescission in hot gaseous environments. The substrate may comprise a SiC—SiC ceramic matrix composite material, and the porous oxide layer may comprise REDs and/or REMs.

Here, the inventor of the instant application has surprisingly discovered that it is advantageous to deposit a layer of a chemically stable porous oxide layer on a silicon-containing substrate. In one embodiment, the porous oxide layer consists of oxide materials that may be deposited with special microstructures to mitigate thermal or mechanical stresses due to thermal expansion mismatch or contact with other articles in the engine environment and to improve adhesion of the coating to the substrate.

The disclosure also teaches a method for reducing the volatization of silicon away from a gas turbine engine article that contains silicon. The method includes a) providing an article comprising a ceramic matrix composite; b) providing an outer surface of said article which is in contact with gases at high temperatures during operation of the gas turbine engine article; and c) bonding a porous oxide layer to at least a portion of said outer surface of the article, such that the rate of volatization, at high temperatures, of silicon away from said outer surface of the article is reduced. High temperature within the scope of the present disclosure include temperatures of 2000 F to 3000 F, and in particular from about 2200 F to about 2800 F.

2. Porous Oxide Layer to Address EBC Spallation

The present disclosure also teaches methods and related articles for increasing the life of the CMC component substantially in the event of a local spall, in some cases by over an order of magnitude. There is a great need in the art to find protection mechanisms to solve the recession/thickness loss of the CMC in the event of a local spallation of the EBC. In one example, the present disclosure meets the engine component life requirement if a local spallation occurs early on during the operation. Furthermore, since the damage can be confined, it is easier to repair the components and reuse them.

One of the problems with EBCs is that they contain oxide layers, which can locally spall off, either by handling and/or by foreign object damage or by manufacturing defects. The inventor observed that local spallation of the EBC occurs at the interface between the silicon bond layer and the outside oxide EBC. The present disclosure, in one example, teaches that by using a layer of a mixture of silicon and an oxide beneath the silicon bond layer, it is possible to delay recession of the substrate (see FIGS. 13 and 14). The silicon and oxide layer are, in one example, a part of the bond coat layer. The silicon and oxide layer may also be used as the outer layer of the CMC or incorporated at selected locations within the CMC.

Embodiments of the disclosure described herein relate to ceramic matrix composites (CMC) and coatings. The inventor of the instant application has discovered, in one example, that improved recession resistant CMC can be achieved by replacing the silicon bond coat with a three layer bond coat system comprising a first layer of silicon, followed by a layer of silicon and an oxide, followed by a layer of silicon (see FIG. 13B). Conventional oxide EBCs can be put on top of this bond coat system.

Aspects of the present disclosure increase the life of the CMC article substantially in the event of a local spall, in some cases by over an order of magnitude. One aspect of the present disclosure is directed to a recession resistant silicon containing article. The recession resistant article may comprise a silicon-containing substrate (or a silicon alloy) having a first coefficient of thermal expansion; and a bond coat comprising a two phase layer of interconnected silicon and interconnected oxide, followed by a layer of silicon, wherein the bond coat is located on top of the substrate to form the recession resistant silicon containing article. The article may further comprise one or more additional oxide layers of the Environmental Barrier Coating on the surface.

Figure 11:
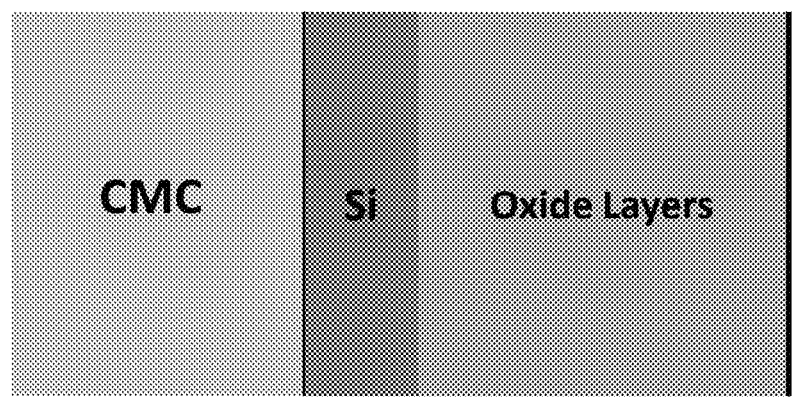
FIG. 11 shows a schematic representation of a current ceramic matrix composite/environmental barrier coating system.

FIG. 11 is a schematic representation of the CMC/EBC system relying on a silicon bond coat. The system works fine at temperatures up to the melting temperature of silicon, as long as the EBC does not spall. The inventors have discovered that during use parts of the EBC spall off. Invariably, the spallation occurs at the interface between the silicon layer and the outer oxide layers, as shown schematically in FIG. 12. Gases diffuse through the spalled region and cause recession of the underlying silicon and, with time, of the underlying CMC. At long enough times, the recession can potentially cause a hole formation in the CMC, the size of the hole strongly correlated to the size of the spalled region.

Figure 12:
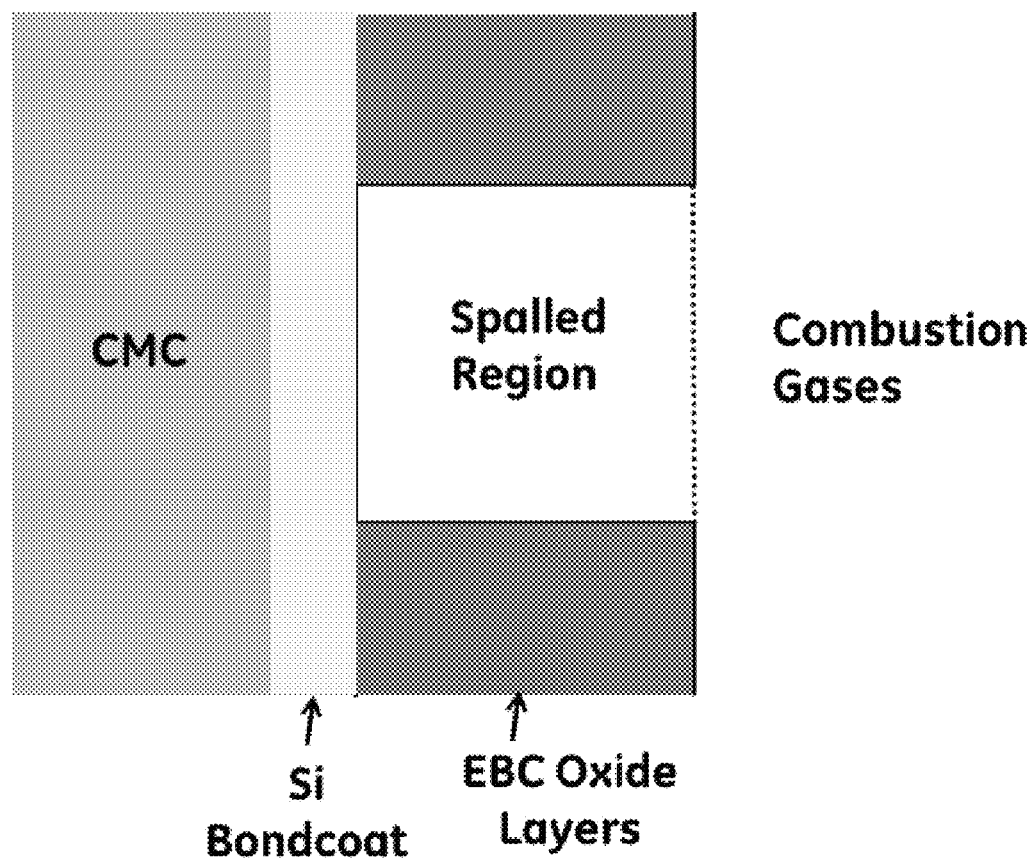
FIG. 12 shows a schematic representation of a current CMC/EBC system with local spallation of EBC.

FIG. 12 shows a schematic of a CMC/EBC system where the ceramic matrix composite is covered by a silicon bondcoat. On the silicon bondcoat is an EBC oxide layer. The figure schematically indicates that due to the hot combustion gases and/or mechanical damage, a section of the EBC oxide layer has spalled off.

Figure 13:
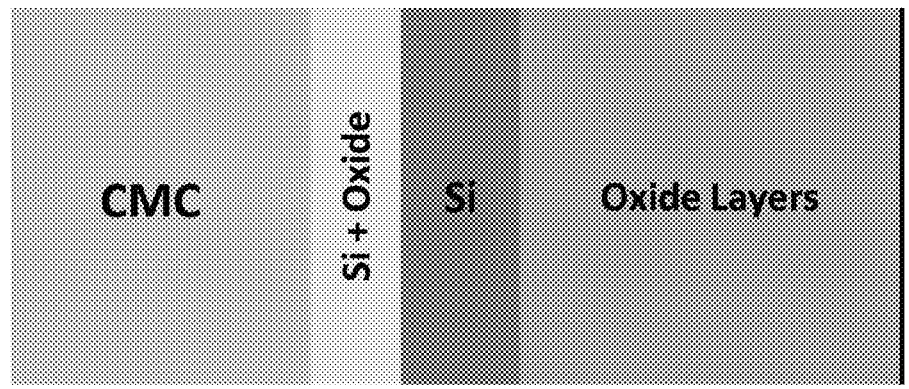
FIG. 13 shows a schematic representation of a CMC substrate followed by a layer of silicon and oxide, followed by a layer of silicon, and followed by oxide layer(s) on top (FIG. 13A).
Figure 13:
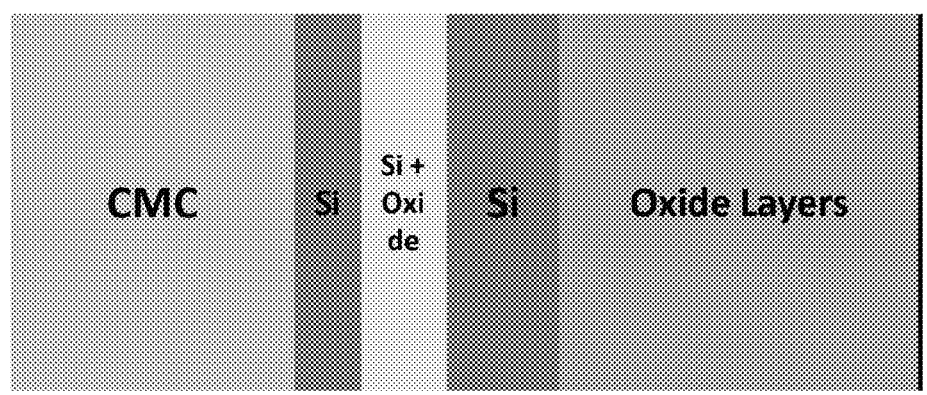

FIG. 13 shows two embodiments of the disclosure to address the spallation problem. FIG. 13A shows a layer of a silicon plus an oxide beneath the silicon layer. When the outer oxide layers spall locally, silicon layer would volatilize and silicon would also volatilize from the two phase silicon and the oxide layer, leaving behind a porous layer which would then reduce the recession rate of the underlying CMC substrate.

The substrate may be a ceramic matrix composite, and the bond coat may be a two layer structure comprising a layer of 5% to 50% (by volume) of interconnected silicon and 50% to 95% oxide, followed by a layer of silicon (see FIG. 13A). The bond coat may also comprise a layer of silicon between the substrate and the two phase interconnected silicon and oxide layer, as shown in FIG. 13B. The first layer of silicon may be up to about 10 mils thick, the second layer of silicon and oxide may be from about 2 mils to about 20 mils thick, and the third silicon layer may be from about 2 mils to about 10 mils thick. The recession resistant article can also further comprise an environmental barrier coating on top of the two or three layer bond coat.

The recession of the underlying substrate, even though it is very slow, can lead to a gap or voids at the SiC/porous oxide layer. If this gap forms, it would reduce the adhesion of the porous layer to the substrate causing it to spall. Therefore, the structure of the two phase layer can be improved upon to improve the adhesion of the underlying substrate to the in situ generated porous layer.

Figure 14:
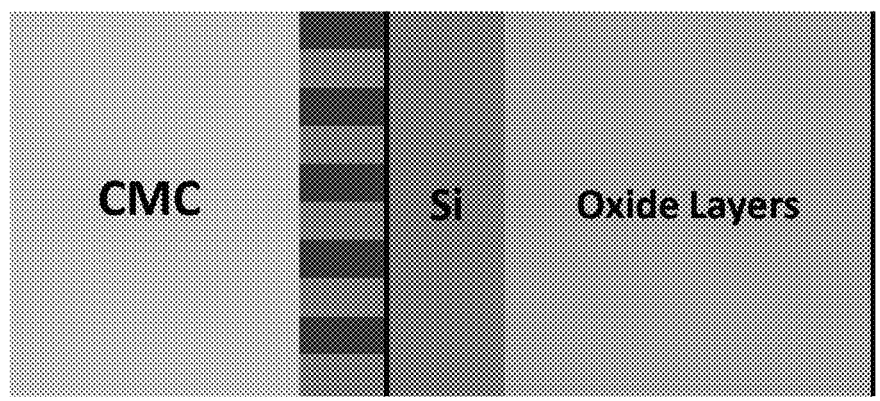
FIG. 14 shows a schematic representation of a CMC substrate followed by a two phase silicon and oxide layer, followed by a silicon layer, followed by oxide layer(s) on top (FIG. 14A).
Figure 14:
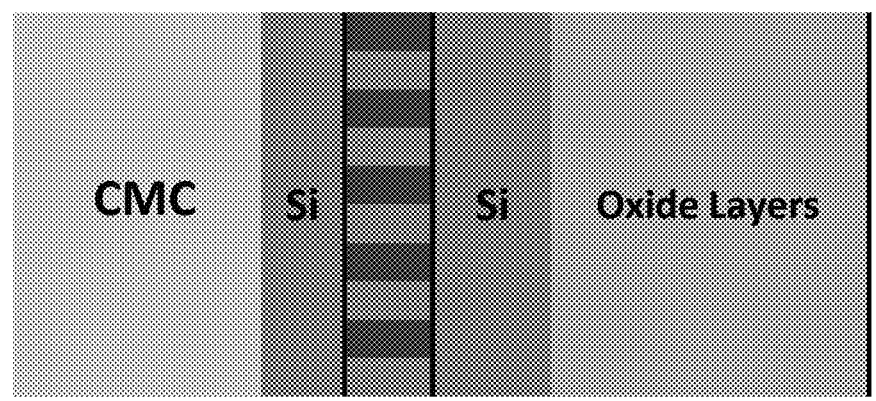

FIG. 14 shows examples of architecture that improve the structural integrity of the in situ generated porous layer. In this example, the oxide in the two phase layer can be applied by a pattern, such as a parallel array, vertical array, a diamond pattern or the like, and the remaining spaces can be filled with silicon. Other embodiments of the structures shown in FIG. 13 are shown in FIG. 14.

The inventor of the instant application observed that the local spallation of the EBC occurs at the interface between the silicon bond layer and the outside oxide EBC. The inventor conceived to create a layer of a mixture of silicon and an oxide beneath the silicon bond layer. In one example, the silicon and oxide layer is part of the bond coat layer, is used as the outer layer of the CMC, or is incorporated at select locations within the CMC.

The porous oxide layer may be created in situ during use by volatilization of a silicon-containing compound, or by the volatilization of silicon from an oxide. The porous layer may be created in situ by volatization of silicon from a mixture of an oxide and a silicon-containing compound; and the silicon containing compound comprises silicon, silicon carbide, silicon nitride, or molybdenum silicide. The oxide may be a Rare Earth Disilicate ($RE_2Si_2O_7$), and during use of the article over time in hot gaseous environments, this Rare Earth Disilicate creates a porous Rare Earth Monosilicate ($RE_2SiO_5$).

Characteristics of the silicon/oxide layer include: the thermal expansion mismatch between the silicon and the oxide is minimum over the temperature range of use of the CMCs, for example, from room temperature to about 2400 F, preferably within $0.5 \times 10^{-6\circ}$ $C.^{-1}$. The oxide is, in one example, interconnected so that the remaining oxide layer after the silicon volatilizes have significant strength to remain significantly intact even under the turbulent conditions in the turbine.

The silicon level may be from about 20% to about 40% by volume. In one example, the silicon level is about 30%. There are several considerations in determining the silicon level, including the location of the EBC spallation when the spallation occurs. Silicon level should be low enough to create minimum, but interconnected porosity, but high enough to ensure that EBC spallation occurs at the interface between two phase silicon-oxide layer and the outer oxide layers.

On EBC spallation, the silicon volatilizes away, leaving behind a porous oxide layer through which $Si(OH)_4$ would have to diffuse before it is removed by convective transport. Diffusion-bonded coatings spall at the metal/oxide interface where the bonding is weakest. Therefore, a higher silicon level helps force the spallation between the silicon and the porous oxide layer. Furthermore, time to consume silicon level and convert disilicate to monosilicate is not a strong function of the silicon level. However, the higher the silicon level, the higher is the porosity of the DS-MS layer subsequent to the silicon volatilization when EBC spalls, which reduces the benefit of the Si-DS layer in reducing the recession rate of the substrate after the silicon volatilizes away from the Si-DS layer.

In one embodiment, the local spallation of the EBC still occurs substantially at the interface between the silicon bond coat and the outside oxide EBC. In one example, the oxide in the silicon-oxide layer is stable under the water vapor environments of the gas turbine. Reaction of the water vapor with the oxide is such that the changes still keep the integrity of the porous oxide layer.

Two classes of oxides meet the above criteria: REDs and Alkaline Earth Aluminosilicates, such as barium strontium alumino silicates. Both of these oxides react with water vapor. REDs decompose to REMs with a volume decrease of about 25%. However, the structural integrity of the resulting monosilicates is still maintained.

One aspect of the present disclosure is directed to a recession resistant article for a gas turbine engine. The article comprises a substrate material comprising silicon that has a first coefficient of thermal expansion; a silicon bondcoat bonded to at least a portion of an outer surface of said substrate material; and an interconnected silicon and an oxide layer positioned between the substrate material and the silicon bondcoat, wherein said interconnected silicon and oxide layer has as second coefficient of thermal expansion (see FIGS. 13 and 14). The layer of interconnected silicon and an oxide has a second coefficient of thermal expansion, and the difference in value between the first and second coefficient of thermal expansion may be no more than about 20%.

With time, the silicon compound from the two phase structure volatilize away as silicon hydroxide leaving behind a porous oxide layer. This porous oxide layer would act as a barrier to reduce the recession of the underlying CMC substrate. The expansion coefficient of the two phase layer is a feature to the success of the coating. The coating can spall off if there is a significant difference in expansion coefficient between the CMC and the dense coating of the two phase mixture. It is desirable to keep the expansion coefficient of the dense two phase layer close to that of the CMC, about 5 ppm per degree C., and in one example between 4 and 6 ppm per degree C.

The article may further comprise a silicon layer located between the substrate and the two phase layer (see FIGS. 13 and 14). Such an intermediate layer is used in some cases between the substrate and the oxide layer to improve the structural integrity of the substrate with the porous layer. The intermediate layer may comprise an oxide and silicon or a silicon-containing compound that is in the form of a continuous network and volatilizes on exposure to water vapor environments leaving behind a porous oxide layer. The intermediate layer may also be a two phase mixture of silicon or silicon carbide and a Rare Earth Disilicate. The intermediate layer can be a two phase mixture of silicon nitride and a Rare Earth Monosilicate.

In one example, the present disclosure can be used to allow for the operation of CMCs at high temperatures, over 2570 F. For example, if the two phase layer contains silicon carbide or silicon nitride, there is no phase that can melt and it can be used at temperatures over about 3000 F. The life of the coating can depend upon the temperature and the operating conditions of the turbine. The commercial advantages include high temperature capability of the articles, which in turn can be used to reduce the cooling air and increase the efficiency of the gas turbine. In one example of prior art, coatings of silicon carbide or silicon nitride underneath an oxide layer are used, however, on oxidation, the silicon carbide and/or silicon nitride form gaseous compounds which destroy the integrity of the oxide layer.

The disclosure also teaches a method for reducing the volatization of silicon away from a gas turbine engine article that contains silicon. The method includes a) providing a article comprising a ceramic matrix composite; b) providing an outer surface of said article which is in contact with gases at high temperatures during operation of the gas turbine engine article; and c) bonding a porous oxide layer to at least a portion of said outer surface of the article, such that the rate of volatization, at high temperatures, of silicon away from said outer surface of the article is reduced. High temperature within the scope of the present disclosure include temperatures of 2000 F to 3000 F, and in particular from about 2200 F to about 2800 F.

FIG. 13 shows a schematic, depicting that the disclosure also teaches a recession resistant article for a gas turbine engine, where the article comprises a silicon-containing substrate which has a silicon bondcoat bonded to at least a portion of its outer surface. The article further comprises interconnected silicon and an oxide layer positioned between the substrate material and the silicon bondcoat. The interconnected silicon and oxide layer has as second coefficient of thermal expansion, and there is about 20% or less difference between the value of the first and second coefficients of thermal expansion. The article may further comprise a silicon layer located between the substrate and the two phase layer. The substrate may be a silicon alloy. The silicon containing ceramic may be a silicon nitride, silicon carbide, silicon oxinitride, a metal silicide, a ceramic matrix composite material, and combinations thereof. Some oxides of interest include Rare Earth Disilicate and Alkaline Earth Monosilicates.

The silicon containing ceramic of the present disclosure can be selected from the group consisting of silicon nitride, silicon carbide, silicon oxinitride, a metal silicide, a ceramic matrix composite material, and combinations thereof. The oxide can have an expansion coefficient of about 5 ppm per degree C.; and the oxide can be chemically stable in moisture containing environments and/or exhibit no more than about 30% negative volume change associated with reaction with water vapor; and such that the oxide is chemically stable with silicon oxide. The oxide may be a Rare Earth Disilicate with an oxide of the element Y and/or Yb and/or Lu. The oxide may be an Alkaline Earth Aluminosilicate with Alkaline Earth Silicate comprising alkaline earth of one or more of the elements of Ba Sr, Ca, and Mg.

The silicon-oxide layer offers protection in two ways: (i) it takes significant time for the silicon to volatilize from the silicon-oxide layer; and (ii) after the silicon volatilizes away, the recession rate of the underneath CMC is substantially reduced. For example, for a turbine operating at 15 atm, a heat transfer coefficient of 1000 British units, a water vapor content of 6%, and at a temperature of 2200 F, the projected recession rate is about 54 mils per thousand hours. This reflects that the total life of a 100 mil CMC article would be about 1850 hours. Under the same conditions, a silicon-Rare Earth Disilicate layer with 35% silicon and a thickness of 4 mil would take about 670-870 hours for the silicon to volatilize. After the silicon volatilizes away, the recession rate of the underlying substrate drops substantially because of the in situ formed porous layer. For example, for a 4 mil thick silicon-Rare Earth Disilicate layer, the in situ created porous layer reduces the recession rate to about 1.4 mils per thousand hours, lower by a factor of about 38 compared to the normal recession rate of 54 mils per one thousand hours.

Thus, the recession resistant silicon containing article of the present disclosure may further comprise a protective porous oxide layer formed in-situ after the outer oxide layer of the EBC spalls during operation of the gas turbine engine article. The article of the present disclosure may further comprise volatization of silicon from the silicon containing article, such that the rate of recession of the underlying substrate drops by a factor of between about 5 and 100 when compared to control recession rates after at least a portion of the outer oxide layers of the EBC spall off. In some conditions, particularly with thick porous layers, the benefits may even be higher than by a factor of 100.

As such, one aspect of the present disclosure is directed to a method for fabricating a recession resistant article for a gas turbine engine. The method comprises providing a silicon containing substrate having a first coefficient of thermal expansion; and bonding a two layer bond coat to at least a portion of an outer surface of the article, wherein the two layer bond coat comprises a layer of interconnected silicon and an oxide, followed by a layer of silicon, and wherein said two layer bond coat has a second coefficient of thermal expansion (see FIGS. 13 and 14). The method may further comprise placing a layer of silicon between the substrate and the two phase silicon and oxide layer.

The method may further comprise bonding a surface layer comprising an environmental barrier coating on top of the two or three layer bond coat. The method may further comprise volatization of silicon from the substrate and the in-situ formation of a protective porous oxide layer over the substrate after the outer oxide layer of the EBC spalls during operation of the gas turbine engine article. The method of the present disclosure may further comprise volatization of silicon from the silicon containing article, such that the rate of recession of the underlying substrate drops by a factor of between 5 and 100 when compared to control recession rates after at least a portion of the outer oxide layers of the EBC spall off.

3. Improving the Recession Resistance of the Substrate by Oxide Addition

As indicated above, the volatilization of silicon-containing ceramics by water vapor present in combustion gases is a problem. It leads to a loss of material, and under some conditions can lead to a thickness loss of as much as a few hundred to a thousand mils of ceramics during the component life time of the order of tens of thousands of hours. For comparison, the thickness of CMC components is expected to be much lower, of the order of a hundred mils or less. Environmental Barrier Coatings (EBCs) are used to prevent the recession of the underlying substrate. However, under some conditions EBCs can spall off or crack, exposing the underlying substrate to the combustion gas environments. It is, therefore, desirable and may even be necessary for many applications to increase the recession resistance of the CMC substrate. The present disclosure is also aimed at increasing the recession resistance of the CMC substrate.

The present disclosure increases the recession resistance of the CMC substrate by the addition of oxide particles. The inventor of the instant application observed that the local spallation of the EBC occurs at the interface between the silicon bond layer and the outside oxide EBC. From this observation, the inventor conceived to create a layer of a mixture of silicon and an oxide beneath the silicon bond layer. In one example, the silicon and oxide layer is part of the bond coat layer, is used as the outer layer of the CMC, or is incorporated at select locations within the CMC. As such, one aspect of the disclosure teaches a recession resistant article that comprises an oxide in a silicon containing substrate, wherein components of the silicon containing substrate are interconnected with oxides dispersed in the substrate and form the bulk of the recession resistant silicon containing article. Both the silicon-containing substrate and the oxide phases may be interconnected independent networks.

The article may further comprise a bond coat located on top of the substrate. The substrate may be a ceramic matrix composite, and the bond coat may comprise a layer of interconnected silicon and an oxide, followed by another layer of silicon. The article may further comprise a silicon layer between the substrate and the two phase interconnected silicon and oxide layer. The recession resistant article of the present disclosure may further comprise an environmental barrier coating on top of the bond coat. The substrate may be coated with an environment barrier coating that is from about 2 mils to about 50 mils thick.

Figure 15:
FIG. 15 shows a silicon carbide/silicon carbide CMC with a multi-layer EBC on top (FIG. 15A).
Figure 15:
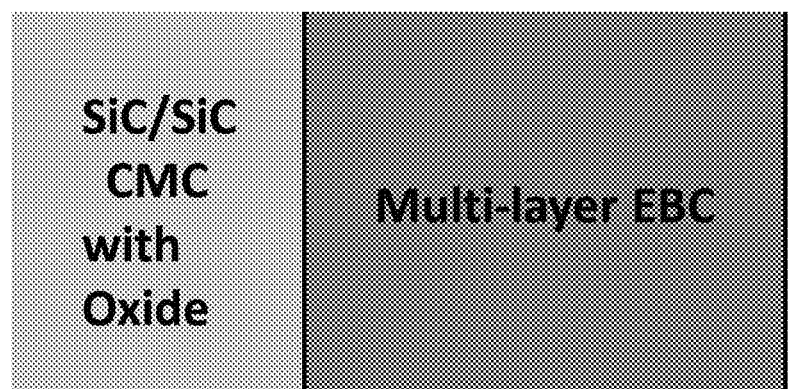
Figure 15:
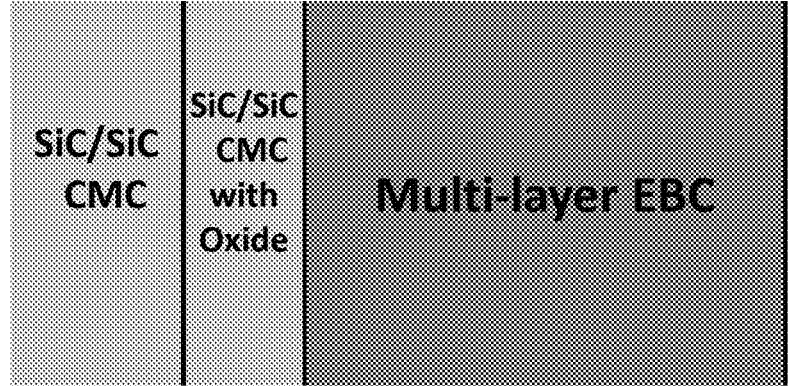

The concept of a porous oxide layer can also be used to increase the recession resistance of the CMC substrate. The CMC substrates are invariably coated with a multi-layer EBC coating as shown in FIG. 15A. A large fraction or most of the SiC/SiC composites is comprised of silicon compounds, such as silicon and silicon carbide, which are prone to volatilization and recession.

FIG. 15B shows that the recession problem can be alleviated by adding oxide particles to the CMC substrate. When the CMC substrate is exposed to the water vapor environments, silicon carbide constituents volatilize leaving oxides behind. The porous oxide film left behind provides protection against recession, thereby reducing the recession rate of the substrate. These oxides can be added to the current MI CMCs or to the other composites, such as CVI composites during the fabrication of the preform. The oxides have low thermal conductivity, which is not desirable for some applications. Therefore, the oxide addition may be tailored to be included at a location where recession resistance of the CMC is important.

FIG. 15C shows an embodiment of the disclosure in FIG. 15B. As is demonstrated, oxide particles here are added only to the surface layer of the CMC, which allows for improved recession resistance on location of the parts where it is most desirable. In other words, the oxide particles can be added either to the surface layer of the CMC or to the entire CMC.

Thus, the present disclosure also teaches a recession resistant silicon containing article that comprises a silicon-containing substrate; and a bond coat comprising a two phase layer of interconnected silicon and interconnected oxide, followed by a layer of silicon. The bond coat is located on top of the substrate to form the recession resistant silicon containing article. The article may further comprise a protective porous oxide layer formed in-situ after the outer oxide layer of the EBC spalls during operation of the gas turbine engine component. The article may further comprise one or more additional oxide layers of the Environmental Barrier Coating on the surface.

In one aspect, the present disclosure works by addition of oxide particles to the SiC containing matrix, made by Melt Infiltration or by other processes, such as Chemical Vapor Infiltration (CVI), Polymer Impregnation Pyrolysis (PIP), sintering, and combination thereof. The substrate can be made by a process of silicon melt infiltration. Thus, in one aspect, the present disclosure is directed to a recession resistant gas turbine component, comprising a silicon containing substrate that has an oxide within it, wherein components of the silicon containing substrate and the oxide are interdispersed and/or interwoven with one another. Oxide phase may be interconnected. The inventor of the instant application conceived that particular oxides would work, for example those that meet some specific criteria, including: an expansion coefficient of around 5 ppm per degree C., and in one example within 4-6 ppm per degree C., (ii) chemically stable in moisture-containing environments, and/or minimal negative volume change associated with reaction with water vapor, and (iii) in one example, also chemically stable with silicon oxide. The oxide may be a Rare Earth Disilicate with an oxide of the element Y and/or Yb and/or Lu.

One aspect of the present disclosure is directed to a method for fabricating a recession resistant article for a gas turbine engine. The method comprises providing a silicon containing substrate having a first coefficient of thermal expansion; and bonding a two layer bond coat to at least a portion of an outer surface of the article, wherein the two layer bond coat comprises a layer of interconnected silicon and an oxide, followed by a layer of silicon, and wherein said two layer bond coat has a second coefficient of thermal expansion (see FIGS. 13 and 14). The method may further comprise a layer of silicon between the substrate and the two phase silicon and oxide layer. The method may further comprise bonding a surface layer comprising an environmental barrier coating on top of the three layer bond coat.

The article can be turbine blades, combustor articles, shrouds, nozzles, heat shields and/or vanes. The article can be coated using conventional methods known to those skilled in the art to produce all desired layers and selectively place composition(s) as either a separate layer, a grain boundary phase, or discrete, dispersed refractory particles. Such conventional methods can generally include, but should not be limited to, plasma spraying, high velocity plasma spraying, low pressure plasma spraying, solution plasma spraying, suspension plasma spraying, high velocity oxygen flame (HVOF), chemical vapor deposition (CVD), electron beam physical vapor deposition (EBPVD), sol-gel, sputtering, slurry processes such as dipping, spraying, tape-casting, rolling, and painting, and combinations of these methods. Once coated, the substrate article may be dried and sintered using either conventional methods, or unconventional methods such as microwave sintering, laser sintering or infrared sintering.

The porous oxide particles may be present in a barrier coating layer on the surface of the silicon-containing substrate. Here, the dispersion of the porous oxide particles into the barrier coating layer can occur by various means depending on the process chosen to deposit the barrier coating. For a plasma spray process, particles of any of the outer layer materials can be mixed with the porous oxide particles before coating deposition. Mixing may consist of combining the outer layer material and the particles without a liquid, or by mixing a slurry of the outer layer material and oxide particles. The dry particles or slurries can then be mechanically agitated using a roller mill, planetary mill, blender, paddle mixer, ultrasonic horn, or any other method known to those skilled in the art. For the slurry process, the oxide particles dispersed in the slurry will become dispersed particles in the coating after drying and sintering of a slurry-deposited layer.

One aspect of the present disclosure is directed to a method of making a preform for melt infiltration. The method comprises providing a ceramic matrix precursor slurry; incorporating one or more oxides, wherein the oxide is one or more rare-earth disilicates ($RE_2Si_2O_7$) and/or one or more of Alkaline Earth Aluminosilicates ($RE_2SiO_5$) into said matrix precursor slurry; wherein the oxide particles are added to the matrix precursor slurry and the composite tape is subsequently prepreged with the slurry, the prepregged tapes are laid up and consolidated into a composite preform, and the preform is subsequently melt infiltrated with silicon or silicon alloy.

The mixture of oxides acts as a gas diffusion barrier and reduces the recession rate of the underlying substrate. The addition of oxide particles is performed by the following process: powders of the appropriate oxides are incorporated into the matrix precursor slurry as a replacement for the SiC and/or C particulate normally used. The slurry is then tape cast or impregnated into a carbon veil material to yield a thin (0.001" to 0.02") sheet of matrix precursor. This sheet is then laid up on the surface of the CMC preform during the normal ply layup process, and is consolidated onto the preform using the normal vacuum bagging and lamination procedure.

The surface layer containing the oxide powder is then melt infiltrated along with the rest of the CMC preform to form an integral surface layer containing the desired oxide particles. Alternately, the slurry containing the oxide particles can be coated onto a CMC preform by techniques such as spray painting or dip coating, followed by melt infiltration. In another example, oxide particles are added to the matrix precursor slurry and then to prepreg composite tapes with this slurry. CMC components are then laid up using such tapes. Oxides particles have much lower thermal conductivity than the silicon carbide, and this may not be desirable for some applications or some locations of the components. The presently taught method can, in one example, be tailored so that the oxide addition is not uniformly in the composite but is selectively done in the desired locations of the component.

As such, another aspect of the present disclosure is directed to a method of making a preform for melt infiltration, where the method comprises a) providing a ceramic matrix precursor slurry; b) incorporating one or more rare-earth disilicates ($RE_2Si_2O_7$) and/or one or more of Alkaline Earth Aluminosilicates into said matrix precursor slurry; c) impregnating the slurry into a carbon veil material or tape casting the slurry to yield a thin sheet of matrix precursor; d) positioning said sheet on the surface of the ceramic matrix composite preform to form a surface layer containing the oxide particles; and e) consolidating said sheet onto the preform using vacuum bagging and lamination or compression molding.

The method may further comprise melt infiltrating the surface layer containing the oxide along with the rest of the ceramic matrix composite preform with molten silicon or silicon-containing alloy to form a surface layer containing the oxide particles. The oxide containing slurry may be coated onto a ceramic matrix composite preform. The coating may be performed by spray painting or dip coating, followed by melt infiltration. Another aspect of the present disclosure is directed to a method of making the surface coating on the Si-containing substrate, wherein the coating is made by making a mixture of a silicon ceramic precursor polymer and the oxide particles, coating the said mixture on the surface of the silicon-containing substrate, heat treating the coated surface to convert the polymer into the ceramic. The polymer impregnation and subsequent heat treatment may be repeated after depositing the first coating. Another example of creating the surface layer is that it can be applied to CMCs made by other techniques including CVI and PIP.

One of the commercial advantages of the approach as presently disclosed is that it is compatible with the existing CMC processes, and it increases the life of the CMC components, thereby reducing their life cycle cost. Prior attempts at solving this problem have primarily focused on EBCs, including the additions of different silicides to the CMC matrix. The silicides potentially have two disadvantages: (i) their expansion coefficients are much higher, and (ii) many silicides, such as those of rare earth metals, react rapidly with oxygen. Consequently, they have not been found to be very effective to date.

4. Additional Features of Present Disclosure

Examples of CMC matrix materials include silicon carbide and silicon nitride. Examples of CMC reinforcing materials include, but are not limited to, silicon carbide, and silicon nitride. Examples of silicon carbide fibers include all commercially available fibers known as silicon carbide fibers, which comprise silicon carbide and may also contain other elements, such as oxygen, carbon, nitrogen, aluminum, and others. Examples of known silicon carbide fibers are the NICALON™ family of silicon carbide fibers available from Nippon Carbon, Japan; Sylramic™ silicon carbide fibers available from COI/ATK, Utah the Tyranno™ family of fibers available from UBE Industries, Japan; and fibers having the trade name SCS-6 or SCS-Ultra produced by Specialty Materials, Inc., Massachusetts. Examples of monolithic ceramics include silicon carbide, silicon nitride, and silicon aluminum oxynitride (SiAlON).

The recession resistant article of the present disclosure may comprise a silicon-containing substrate that has a silicon bondcoat on at least a portion of the outer surface of the substrate, and between this substrate and bondcoat, interconnected silicon and an oxide layer is found. The structure of the interconnected silicon and interconnected oxide may be in the form of vertical arrays, lattice arrays, or parallel arrays. In the vertical arrays, the interconnected silicon and interconnected oxide are vertical arrays roughly normal to the surface of the substrate. In the lattice arrays, the interconnected silicon and interconnected oxide are in the form of a lattice or grid relative to the surface of the substrate. Furthermore, in the parallel arrays, the interconnected silicon and interconnected oxide are parallel to each other relative to the surface of the substrate. The silicon-containing substrate may be deposited by a CVD process, and the oxide may be deposited by a plasma spraying process or a slurry coating process. In another embodiment, silicon in the two phase silicon-oxide layer may be replaced with silicon carbide or silicon nitride.

The oxide may be a Rare Earth Disilicate ($RE_2Si_2O_7$), and during use of the article over time in hot gaseous environments, the Rare Earth Disilicate creates a porous Rare Earth Monosilicate ($RE_2SiO_5$). The oxide layer may comprise hafnium oxide and/or barium strontium aluminosilicate. In one example, the oxide layer is chemically stable in moisture containing environments and/or exhibits no more than about 30% negative volume change associated with reaction with water vapor. The oxide layer may also be chemically stable with silicon oxide and have an expansion coefficient of about 5 ppm per degree C. The porous oxide layer can be from about 1 mil to about 50 mils thick. The chemically stable oxide may be one or more of REDs ($RE_2Si_2O_7$) and Alkaline Earth Aluminosilicate. In another embodiment, it may be Rare Earth Monosilicate ($RE_2SiO_5$). (Rare Earth Monosilicate is generally stable with water vapor but not with silica. It reacts with silica to form Rare Earth Disilicate).

The article or component may comprise a part of a gas turbine assembly. For example, the article or component can be selected from the group consisting of combustor articles, turbine blades, shrouds, nozzles, heat shields and vanes.

Various articles of the gas turbine engine are formed of a ceramic material or ceramic matrix composite (CMC) material. The CMC material may be a SiC/SiC CMC material. The SiC—SiC CMC material includes a silicon carbide composite material infiltrated with silicon and reinforced with coated silicon carbide fibers. The ceramic material may be a monolithic ceramic material, such as SiC. The silicon containing substrate may be a ceramic and selected from the group consisting of silicon nitride, silicon carbide, silicon oxinitride, a metal silicide, a ceramic matrix composite material, and combinations thereof. The ceramic matrix composite, in one example, comprises a SiC—SiC ceramic matrix composite.

The article may be a gas turbine engine component that contains, by volume, 10% to 60% of one or more rare-earth silicate oxide containing compounds. In one example, this range is from about 20% to about 40%. In a particular example, a gas turbine engine component contains, by volume, about 30% of one or more rare-earth oxide containing compounds.

"Rare Earth Elements" include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof.

"Rare Earth Silicate Oxides" can refer to silicates of $Sc_2O_3$, $Y_2O_3$, $CeO_2$, $La_2O_3$, $Pr_2O_3$, $Nd_2O_3$, $Pm_2O_3$, $Sm_2O_3$, $EU_2O_3$, $Gd_2O_3$, $Tb_2O_3$, $Dy_2O_3$, $HO_2O_3$, $Er_2O_3$, $Tm_2O_3$, $Yb_2O_3$, $Lu_2O_3$ or mixtures thereof. In one example, the group consisting of oxides may include Alkaline Earth Aluminosilicates. The oxide may be a Rare Earth Disilicate with an oxide of an element chosen from the group consisting of Sc, Y, La, Ce, Pr, Nd, Pm, Sm, Eu, Gd, Tb, Dy, Ho, Er, Tm, Yb, Lu, or combination thereof. The oxide may be a Rare Earth Disilicate with an oxide of the element Y and/or Yb and/or Lu. In a particular example, the oxide is hafnium oxide. The oxide may also be an Alkaline Earth Aluminosilicate comprising alkaline earth of one or more of the elements of Ba Sr, Ca, and Mg.

"Alkaline Earth Elements" within the scope of the present disclosure include magnesium (Mg), calcium (Ca), strontium (Sr), barium (Ba), and mixtures thereof. Additionally, rare earth elements include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), lanthanum (La), cerium (Ce), praseodymium (Pr), neodymium (Nd), promethium (Pm), samarium (Sm), europium (Eu), gadolinium (Gd), and mixtures thereof.

As used herein, "chemically stable" indicates the dictionary definition. In this context, chemically stable indicates that there is little or no direct reaction between the chemically stable porous oxide layer and the substrate, ceramic matrix composite or silicon oxide or other layers in the system. In another context, chemically stable is meant to indicate chemically stable with reference to water vapor in the combustion gases, which means that it does not substantially react to form another compound. For example, it is stable in hot water vapor environments, with a volume change of less than about 30%. Another way of expressing chemical stability with reference to water vapor is that the recession rate of the oxide is acceptably low. For example, REDs are not very stable but decompose to form REMs with a volume change of about 25%, and the REMs are stable in water vapor environments.

Two classes of oxides potentially meet criteria of aspects of the present disclosure: REDs, such as yttrium/ytterbium disilicate, and Alkaline Earth Aluminosilicates, such as Barium Strontium aluminosilicate.

Mixtures of silicon or silicon compound and oxides can generate a porous layer in situ because with time the silicon containing phase volatilizes leaving behind a porous oxide layer.

Aspects of the present disclosure increase the life of the CMC article substantially in the event of a local EBC spall, in some cases by an order of magnitude. One aspect of the present disclosure is directed to a recession resistant silicon containing article, comprising: a silicon-containing substrate having a first coefficient of thermal expansion; and a bond coat comprising a two phase layer of interconnected silicon and interconnected oxide, followed by a layer of silicon, wherein the bond coat is located on top of the substrate to form the recession resistant silicon containing article. In one embodiment, the article further comprises one or more additional oxide layers of the Environmental Barrier Coating on the surface. In one embodiment, the substrate is a silicon alloy.

In one embodiment, the silicon containing ceramic is selected from the group consisting of silicon nitride, silicon carbide, silicon oxinitride, a metal silicide, a ceramic matrix composite material, and combinations thereof. In another embodiment, the oxide has an expansion coefficient of about 5 ppm per degree C.; wherein the oxide is chemically stable in moisture containing environments and/or exhibits no more than about 30% negative volume change associated with reaction with water vapor; and wherein the oxide is chemically stable with silicon oxide. In one embodiment, the oxide is a Rare Earth Disilicate with an oxide of the element Y and/or Yb and/or Lu. In one embodiment, the oxide is an Alkaline Earth Aluminosilicate comprising Alkaline Earth Silicate of one or more of the elements of Ba Sr, Ca, and Mg.

In one embodiment, the recession resistant silicon containing article of the present disclosure further comprises a protective porous oxide layer formed in-situ after the outer oxide layer of the EBC spalls during operation of the gas turbine engine component. In one embodiment, the recession resistant silicon containing article of the present disclosure further comprises volatization of silicon from the silicon containing article, such that the rate of recession of the underlying substrate drops by a factor of between 5 and 100 when compared to control recession rates after at least a portion of the outer oxide layers of the EBC spall off.

In one embodiment, the layer of interconnected silicon and an oxide has a second coefficient of thermal expansion, and wherein the difference in value between the first and second coefficient of thermal expansion is no more than about 20%. In one embodiment, the article further comprises a silicon layer located between the substrate and the two phase layer.

One aspect of the present disclosure is directed to a recession resistant article for a gas turbine engine, said article comprising: a substrate material comprising silicon, wherein said substrate material has a first coefficient of thermal expansion; a silicon bondcoat bonded to at least a portion of an outer surface of said substrate material; an interconnected silicon and an oxide layer positioned between the substrate material and the silicon bondcoat, wherein said interconnected silicon and oxide layer has a second coefficient of thermal expansion, wherein there is about 20% or less difference between the value of the first and second coefficients of thermal expansion.

In one embodiment, the substrate is a ceramic matrix composite, and the bond coat comprises a layer of 5% to 50% (by volume) of interconnected silicon and 50% to 95% oxide, followed by a layer of silicon. In one embodiment, the article further comprises a layer of silicon between the substrate the interconnected silicon-oxide layer. In another embodiment, the first layer of silicon is up to about 10 mils thick, the second layer of interconnected silicon and oxide layer is from about 2 mils to about 20 mils thick, and the third layer is from about 2 mils to about 10 mils thick. The recession resistant article, in one example, further comprises an environmental barrier coating on top of the three layer bond coat.

In one embodiment, the structure of the interconnected silicon and interconnected oxide is in the form of vertical arrays, lattice arrays, or parallel arrays; wherein in the vertical arrays, the interconnected silicon and interconnected oxide are vertical arrays roughly normal to the surface of the substrate; wherein in the lattice arrays, the interconnected silicon and interconnected oxide are in the form of a lattice or grid relative to the surface of the substrate; and wherein in the parallel arrays, the interconnected silicon and interconnected oxide are parallel to each other relative to the surface of the substrate. The silicon-containing substrate is, in one example, deposited by a CVD process. In one embodiment, the oxide is deposited by a plasma spraying process or a slurry coating process.

One aspect of the present disclosure is directed to a method for fabricating a recession resistant article for a gas turbine engine, said method comprising: providing a silicon containing substrate having a first coefficient of thermal expansion; and bonding a two layer bond coat to at least a portion of an outer surface of the article, wherein the two layer bond coat comprises a layer of interconnected silicon and an oxide, followed by a layer of silicon, and wherein said two layer bond coat has a second coefficient of thermal expansion. In one embodiment, the method further comprises placing a layer of silicon between the substrate and the two phase silicon and oxide layer. In one embodiment, the method further comprises bonding a surface layer comprising an environmental barrier coating on top of the three layer bond coat.

In one embodiment, the method further comprises volatization of silicon from the substrate and the in-situ formation of a protective porous oxide layer over the substrate after the outer oxide layer of the EBC spalls during operation of the gas turbine engine article. In another embodiment, the method of the present disclosure further comprises volatization of silicon from the silicon containing article, such that the rate of recession of the underlying substrate drops by a factor of between 5 and 100 when compared to control recession rates after at least a portion of the outer oxide layers of the EBC spall off. In some conditions, particularly with thick porous layers, the benefits may even be higher than by a factor of 100. In one embodiment, there is about 20% or less difference between the value of the first and second coefficients of thermal expansion.

Another aspect of the present disclosure is directed to a recession resistant article, comprising an oxide in a silicon containing substrate, wherein components of the silicon containing substrate is interconnected with oxides dispersed in the substrate and form the bulk of the recession resistant silicon containing article. In one embodiment, both the silicon-containing substrate and the oxide phases are interconnected independent networks. In another embodiment, the substrate comprises a SiC—SiC ceramic matrix composite.

In one embodiment, the oxide has an expansion coefficient of about 5 ppm per degree C.; wherein the oxide is chemically stable in moisture containing environments and/or exhibits minimal negative volume change associated with reaction with water vapor (for e.g., no more than 30%). In another embodiment, the oxide is chemically stable with silicon oxide. In one embodiment, the article is a gas turbine engine component and wherein said component contains, by volume, about 10% to 60% of the rare-earth silicate oxide containing compound, preferably between about 20 and 40%.

In one embodiment, the oxide is a Rare Earth Disilicate with an oxide of one or more elements selected from the group consisting of Sc, Y, La, Ce, Pr, Nd, Pm, Sm, Eu, Gd, Tb, Dy, Ho, Er, Tm, Yb and Lu. The oxide is, in one example, a Rare Earth Disilicate with an oxide of the element Y and/or Yb and/or Lu. In another example, the oxide is hafnium oxide. In one embodiment, the oxide is an Alkaline Earth Aluminosilicate comprising Alkaline Earth Silicate of one or more of the elements of Ba Sr, Ca, and Mg.

In one embodiment, the article further comprises a bond coat located on top of the substrate. In one embodiment, the substrate is a ceramic matrix composite, and the bond coat comprises a layer of interconnected silicon and an oxide, followed by another layer of silicon. In one embodiment, the article further comprises a silicon layer between the substrate and the two phase silicon and oxide layer. The recession resistant article of the present disclosure, in one example, further comprises an environmental barrier coating on top of the bond coat. In one embodiment, the substrate is coated with an environment barrier coating that is from about 2 mils to about 50 mils thick.

In another embodiment, the substrate is made by a process of polymer impregnation pyrolysis, chemical vapor infiltration, melt infiltration, sintering, and combination thereof. In a related embodiment, the substrate is made by a process of silicon melt infiltration. In one embodiment, the article comprises a component of a gas turbine assembly. In another embodiment, the recession resistant article is a gas turbine engine component selected from the group consisting of combustor components, turbine blades, shrouds, nozzles, heat shields and vanes.

One aspect of the present disclosure is directed to a recession resistant gas turbine component, comprising a silicon containing substrate that has an oxide within it, wherein components of the silicon containing substrate and the oxide are interconnected and/or interwoven with one another. In one example, the oxide has an expansion coefficient of about 5 ppm per degree C.; wherein the oxide is chemically stable in moisture containing environments and/or exhibits no more than about 30% negative volume change associated with reaction with water vapor; and wherein the oxide is chemically stable with silicon oxide.

Another aspect of the present disclosure is directed to a method of making a preform for melt infiltration, comprising: a) providing a ceramic matrix precursor slurry; b) incorporating one or more Rare Earth Disilicates ($RE_2Si_2O_7$) and/or one or more of Alkaline Earth Aluminosilicates ($RE_2SiO_5$) into said matrix precursor slurry; c) impregnating the slurry into a carbon veil material or tape casting the slurry to yield a thin sheet of matrix precursor; d) positioning said sheet on the surface of the ceramic matrix composite preform to form a surface layer containing the oxide particles; and e) consolidating said sheet onto the preform using vacuum bagging and lamination or compression molding.

In one embodiment, the method further comprises melt infiltrating the surface layer containing the oxide along with the rest of the ceramic matrix composite preform with molten silicon or silicon-containing alloy to form a surface layer containing the oxide particles. In one embodiment, the oxide containing slurry is coated onto a ceramic matrix composite preform. In another embodiment, the said coating is performed by spray painting or dip coating, followed by melt infiltration.

One aspect of the present disclosure is directed to a method of making a preform for melt infiltration, comprising: a) providing a ceramic matrix precursor slurry; b) incorporating one or more oxides, wherein the oxide is one or more rare-earth disilicates ($RE_2Si_2O_7$) and/or one or more of Alkaline Earth Aluminosilicates ($RE_2SiO_5$) into said matrix precursor slurry; wherein the oxide particles are added to the matrix precursor slurry and the composite tape is subsequently prepregged with the slurry, the prepregged tapes are laid up and consolidated into a composite preform, and the preform is subsequently melt infiltrated with silicon or silicon alloy.

Another aspect of the present disclosure is directed to a method of making the surface coating on the Si-containing substrate, wherein the coating is made by making a mixture of a silicon ceramic precursor polymer and the oxide particles, coating the said mixture on the surface of the silicon-containing substrate, heat treating the coated surface to convert the polymer into the ceramic. In one embodiment, the polymer impregnation and subsequent heat treatment are repeated after depositing the first coating.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to define the parameters of the disclosure, they are by no means limiting and are exemplary embodiments. Many other embodiments will be apparent to those of ordinary skill in the art upon reviewing the above description. The scope of the disclosure should, therefore, be determined with reference to the appended claims, along with the full scope of equivalents to which such claims are entitled.

In the appended description, the terms "including" and "in which" are used as the plain-English equivalents of the respective terms "comprising" and "wherein." Moreover, in the following claims, the terms "first," "second," etc. if any, are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the disclosure, including the best mode, and also to enable any person of ordinary skill in the art to practice the embodiments of disclosure, including making and using any devices or systems and performing any incorporated methods. The patentable scope of the disclosure is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

While the invention has been described in detail in connection with only a limited number of embodiments, it should be readily understood that the invention is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the invention have been described, it is to be understood that aspects of the disclosure may include only some of the described embodiments. Accordingly, the disclosure is not to be seen as limited by the foregoing description, but is only limited by the scope of the appended claims.

The invention claimed is:

1. A recession resistant gas turbine component, comprising:
 a SiC—SiC ceramic matrix composite substrate;
 an intermediate layer disposed on and in contact with the substrate, the intermediate layer comprising a patterned array of a rare earth oxide, spaces in the patterned array being filled by a first silicon-containing compound or a first two-phase mixture of the rare earth oxide and the first silicon-containing compound; and
 a porous layer disposed on and in contact with the intermediate layer, the porous layer comprising a second two-phase mixture of a second silicon-containing compound and an oxide comprising one or more rare earth silicates and alkaline earth aluminosilicates.

2. The article of claim 1, wherein the porosity of the porous layer is about 5% to about 50%.

3. The article of claim 2, wherein the porosity of the porous layer is graded.

4. The article of claim 3, wherein the graded porous layer has an inner layer and an outer layer, the inner layer is chemically stable with silicon oxide and the outer layer has a higher stability in a water vapor environment than the inner layer.

5. The article of claim 4, wherein the inner layer is a Rare Earth Disilicate ($RE_2Si_2O_7$) and the outer layer is a Rare Earth Monosilicate ($RE_2SiO_5$), wherein RE is an element chosen from the group consisting of Sc, Y, La, Ce, Pr, Nd, Pm, Sm, Eu, Gd, Tb, Dy, Ho, Er, Tm, Yb, Lu, or a combination thereof.

6. The article of claim 2, wherein the porous layer has a coefficient of thermal expansion of about 5 ppm per degree C.

7. The article of claim 1, wherein the porous layer comprises hafnium oxide and/or barium strontium aluminosilicate.

8. The article of claim 1, wherein the porous layer is from about 1 mil to about 50 mils thick.

9. The article of claim 1, wherein the article is a combustor article, a turbine blade, a shroud segment, a nozzle, a heat shield, or a vane.

10. The article of claim 1, wherein the first two phase mixture is a mixture of silicon or silicon carbide and a Rare Earth Disilicate.

11. The article of claim 1, wherein the first two phase mixture is a mixture of silicon nitride and a Rare Earth Monosilicate.

12. The article of claim 1, wherein the patterned array is in the form of a vertical array, a lattice array, or a parallel array, wherein
 in the vertical array, the rare earth oxide and the silicon-containing compound or the first two phase mixture are vertical arrays roughly normal to the surface of the substrate,
 in the lattice arrays, the rare earth oxide and the silicon-containing compound or the first two phase mixture are in the form of a lattice or grid relative to the surface of the substrate,
 in the parallel arrays, the rare earth oxide and the silicon-containing compound or the first two phase mixture are parallel to each other relative to the surface of the substrate.

13. The article of claim 1, further comprising:
 an environmental barrier coating disposed on and in contact with the porous layer, wherein the environmental barrier coating is from about 2 mils to about 50 mils thick.

14. The article of claim 1, wherein the porous layer has a tortuosity of between 2 to 4.

15. The article of claim 1, wherein the second two phase mixture is 5% to 50% by volume of the second silicon-containing compound and 50% to 95% of the oxide comprising one or more rare earth silicates and alkaline earth aluminosilicates.

16. The article of claim 1, wherein the oxide comprising one or more rare earth silicates and alkaline earth aluminosilicates comprises interconnected oxides.

* * * * *